United States Patent
Biswas

(10) Patent No.: US 12,417,775 B2
(45) Date of Patent: Sep. 16, 2025

(54) METHOD AND APPARATUS FOR NEURAL NETWORK BASED PROCESSING OF AUDIO USING SINUSOIDAL ACTIVATION

(71) Applicant: DOLBY INTERNATIONAL AB, Dublin (IE)

(72) Inventor: Arijit Biswas, Schwaig bei Nuernberg (DE)

(73) Assignee: DOLBY INTERNATIONAL AB, Dublin (IE)

(*) Notice: Subject to any disclaimer, the term of this patent is extended or adjusted under 35 U.S.C. 154(b) by 339 days.

(21) Appl. No.: 18/249,159

(22) PCT Filed: Oct. 15, 2021

(86) PCT No.: PCT/EP2021/078653
§ 371 (c)(1),
(2) Date: Apr. 14, 2023

(87) PCT Pub. No.: WO2022/079264
PCT Pub. Date: Apr. 21, 2022

(65) Prior Publication Data
US 2024/0021210 A1   Jan. 18, 2024

Related U.S. Application Data

(60) Provisional application No. 63/092,242, filed on Oct. 15, 2020.

(30) Foreign Application Priority Data

Dec. 1, 2020   (EP) ..................................... 20210969

(51) Int. Cl.
G10L 25/30   (2013.01)
G10L 19/26   (2013.01)

(52) U.S. Cl.
CPC .............. *G10L 19/26* (2013.01); *G10L 25/30* (2013.01)

(58) Field of Classification Search
CPC ............................... G10L 19/26; G10L 25/30
(Continued)

(56) References Cited

U.S. PATENT DOCUMENTS 4,567,591 A  *  1/1986  Gray ..................... H03M 13/05
                                                            370/535
10,068,557 B1     9/2018  Engel
(Continued)

FOREIGN PATENT DOCUMENTS

WO     2019109290 A1   6/2019
WO     2020042707 A1   3/2020
(Continued)

OTHER PUBLICATIONS

Annamalai, L. et al. "EvAn: Neuromorphic Event-based Anomaly Detection" Arxiv, Nov. 21, 2019, pp. 1-7, 7 pages.
(Continued)

*Primary Examiner* — Bharatkumar S Shah

(57) ABSTRACT

Described herein is a method of processing an audio signal using a deep-learning-based generator, wherein the method includes the steps of: (a) inputting the audio signal into the generator for processing the audio signal; (b) mapping a time segment of the audio signal to a latent feature space representation, using an encoder stage of the generator; (c) upsampling the latent feature space representation using a decoder stage of the generator, wherein at least one layer of the decoder stage applies sinusoidal activation; and (d) obtaining, as an output from the decoder stage of the generator, a processed audio signal. Described are further a method for training said generator and respective apparatus, systems and computer program products.

20 Claims, 15 Drawing Sheets

(58) Field of Classification Search
USPC .......................................................... 704/500
See application file for complete search history.

(56) References Cited

U.S. PATENT DOCUMENTS

| | | | |
|---|---|---|---|
| 10,268,883 B2 | 4/2019 | Sarkar | |
| 2009/0150143 A1* | 6/2009 | Kim | G10L 19/26 |
| | | | 704/226 |
| 2015/0051905 A1* | 2/2015 | Gao | G10L 19/125 |
| | | | 704/207 |
| 2018/0121788 A1 | 5/2018 | Hashimoto | |
| 2018/0129937 A1 | 5/2018 | Bradbury | |
| 2019/0066713 A1 | 2/2019 | Mesgarani | |
| 2019/0205745 A1 | 7/2019 | Sridharan | |
| 2019/0205766 A1 | 7/2019 | Krebs | |
| 2019/0286951 A1 | 9/2019 | Rabinovich | |
| 2020/0020098 A1 | 1/2020 | Odry | |
| 2020/0034627 A1 | 1/2020 | Zhu | |
| 2020/0041276 A1 | 2/2020 | Chakravarty | |
| 2020/0065969 A1 | 2/2020 | Huang | |
| 2020/0098139 A1 | 3/2020 | Kaplanyan | |
| 2020/0125959 A1 | 4/2020 | Beyene | |
| 2020/0160546 A1 | 5/2020 | Gu | |
| 2020/0184595 A1 | 6/2020 | Hoogeboom | |
| 2020/0184987 A1 | 6/2020 | Kupryjanow | |
| 2021/0327445 A1 | 10/2021 | Biswas | |
| 2023/0178084 A1 | 6/2023 | Biswas | |

FOREIGN PATENT DOCUMENTS

| | | | | |
|---|---|---|---|---|
| WO | 2022081915 A1 | 4/2022 | | |
| WO | WO-2022079264 A2 * | 4/2022 | ............. | G06N 3/044 |

OTHER PUBLICATIONS

Kim, S. et al."Recurrent models for auditory attention in multi-microphone distance speech recognition" ArXiv preprint, Jul. 7, 2005, pp. 1-9, 9 pages.

Liu, L. et al."Masked Pre-trained Encoder base on Joint CTC-Transformer" Arxiv, May 25, 2020, pp. 1-5, 5 pages.

Maas, A. et al : "Recurrent Neural Networks for Noise Reduction in Robust ASR", Interspeech, Sep. 9, 2012, pp. 1-4, 4 pages.

Nguyen, Nam Son et al "Audio Noise Filter using Cycle Consistent Adversarial Network—CycleGAN ANF" , 2019 IEEE 5th International Conference on Computer and Communications (ICCC), Dec. 6, 2019 (Dec. 6, 2019), pp. 884-888, 5 pages.

Tian Q. et al."TFGAN: Time and Frequency Domain Based Generative Adversarial Network for High-fidelity Speech Synthesis", Arxiv.org, Cornell University Library, 201 Olin Library Cornell University Ithaca, NY 14853, Nov. 24, 2020 pp. 1-5, 5 pages.

Ye S. et al "Tdcgan: Temporal Dilated Convolutional Generative Adversarial Network for End-to-end Speech Enhancement" Arxiv. org, Cornell University Library, 201 Olin Library Cornell University Ithaca, NY 14853, Aug. 18, 2020, pp. 1-7, 7 pages.

* cited by examiner

METHOD AND APPARATUS FOR NEURAL NETWORK BASED PROCESSING OF AUDIO USING SINUSOIDAL ACTIVATION

CROSS-REFERENCE TO RELATED APPLICATION

This application is a U.S. National Phase entry under U.S.C. 371 of International Application No. PCT/EP2021/078653, filed 15 Oct. 2021 (reference D20086WO01), which claims priority of the following priority application: U.S. provisional application 63/092,242 (reference: D20086USP1), filed 15 Oct. 2020 and EP Application Serial No. 20210969.0 (reference: D20086EP), filed on 1 Dec. 2020, each of which is hereby incorporated by reference in its entirety.

TECHNOLOGY

The present disclosure relates generally to a method of processing an audio signal using a deep-learning-based generator. In particular, a time segment of an audio signal is mapped to a latent feature space representation using an encoder stage of the generator followed by upsampling the latent feature space representation using a decoder stage of the generator, wherein at least one layer of the decoder stage applies sinusoidal activation. The present disclosure further relates to a method for training a generator in a Generative Adversarial Network (GAN) setting comprising the generator and a discriminator. The present disclosure relates moreover also to respective apparatus, systems and computer program products.

While some embodiments will be described herein with particular reference to that disclosure, it will be appreciated that the present disclosure is not limited to such a field of use and is applicable in broader contexts.

BACKGROUND

Any discussion of the background art throughout the disclosure should in no way be considered as an admission that such art is widely known or forms part of common general knowledge in the field.

During the last years, deep learning approaches have become more and more attractive in various fields of application including speech enhancement. In general, recent work is based mostly on deep convolutional GANs (popularly known as DCGAN). Most of the deep learning approaches up to now relate to speech denoising.

As to denoising, intuitively one may consider coding artifact reduction and de-noising to be highly related. However, removal of coding artifacts/noise that are highly correlated to the desired sounds appears to be more complicated than removing other noise types (in de-noising application) that are often less correlated. The characteristics of coding artifacts depend on the codec and the employed coding tools, and the selected bitrate. In addition, modelling audio signals that comprise tonal content, such as speech and music, is even more complicated due to periodic functions naturally included in this kind of signals.

In view of the above, there is thus an existing need for improving deep-learning-based approaches towards processing of audio signals comprising tonal content.

It is further noted that the restoration of audio from coding noise is a challenging problem. Deep convolutional GANs used to reduce coding artifacts and coding noise are, however, quite complex in terms of model parameters and/or memory usage thus introducing a high computational load.

Thus, there is also an existing need for improving deep-learning based approaches towards increased efficiency and reduced computational load.

SUMMARY

In accordance with a first aspect of the present disclosure there is provided a method of processing an audio signal using a deep-learning-based generator, the generator comprising an encoder stage and a decoder stage, each including multiple layers with one or more filters in each layer, the last layer of the encoder stage mapping to a latent feature space representation comprising a plurality of elements along a channel dimension and a time dimension. The method may include the step of (a) inputting the audio signal into the generator for processing the audio signal. The method may further include the step of (b) mapping a time segment of the audio signal to the latent feature space representation, using the encoder stage of the generator. The method may further include the step of (c) applying time and channel recurrence to the latent feature space representation to obtain a modified latent feature space representation. And the method may include the step of (e) obtaining, as an output from the decoder stage of the generator, a processed audio signal based on the modified latent feature space representation.

In some embodiments, the method may further include the step of receiving an audio bitstream including the audio signal.

In some embodiments, the method may further include core decoding the audio bitstream to obtain the audio signal.

In some embodiments, the method may be performed in a perceptually weighted domain, wherein in step (e) a processed audio signal in the perceptually weighted domain may be obtained as an output from the decoder stage of the generator.

In some embodiments, the method may further include the step of converting the processed audio signal from the perceptually weighted domain to an original signal domain.

In some embodiments, converting the processed audio signal from the perceptually weighted domain to the original signal domain may be based on applying an inverse mask to the processed audio signal in the perceptually weighted domain, the inverse mask being calculated based on a psychoacoustic model.

In some embodiments, the audio bitstream may further include metadata indicative of the mask to be applied for converting the processed audio signal from the perceptually weighted domain to the original signal domain.

In some embodiments, the generator may be a generator trained in the perceptually weighted domain.

In some embodiments, the generator may be a generator trained in a Generative Adversarial Network setting.

In some embodiments, in at least one layer of the encoder stage and at least one layer of the decoder stage a non-linear operation may be performed including one or more of ReLU, PReLU, LReLU, eLU and SeLU.

In some embodiments, the generator may further include a non-strided (meaning stride=1) transposed convolutional layer as an output layer following a last layer of the decoder stage.

In some embodiments, one or more skip connections may exist between respective homologous layers of the encoder stage and the decoder stage of the generator.

In some embodiments, the generator may further include a recurrent unit subsequent to the last layer of the encoder stage for applying the time and channel recurrence to the latent feature space representation.

In some embodiments, the recurrent unit may include one or more instances of a time recurrent neural network and one or more instances of a channel recurrent neural network.

In some embodiments, each of the one or more instances of the time recurrent neural network may process a series of elements of the plurality of elements comprised in the latent feature space representation along the time dimension, and each of the one or more instances of the channel recurrent neural network may process a series of elements of the plurality of elements comprised in the latent feature space representation along the channel dimension.

In some embodiments, the time recurrent neural network and the channel recurrent neural network each may include two or more $L_{RNN}$ layers and M hidden activations, wherein M is a natural number $\geq 1$.

In some embodiments, outputs of the one or more instances of the time recurrent neural network and outputs of the one or more instances of the channel recurrent neural network may be concatenated along the channel dimension, followed by mapping to the modified latent feature space representation using a linear layer.

In some embodiments, prior to concatenation, the outputs of the one or more instances of the time recurrent neural network may be stacked and the outputs of the one or more instances of the channel recurrent neural network may be transposed and stacked.

In some embodiments, the recurrent neural networks may be long short-term memories or gated recurrent units.

In some embodiments, a random noise vector z may be applied to the modified latent feature space representation for modifying audio.

In some embodiments, the method may further include the following steps to be performed before step (a): (i) inputting an audio training signal into the generator; (ii) generating, by the generator, a processed audio training signal based on the audio training signal by applying time and channel recurrence to the latent feature space representation of the audio training signal to obtain a modified latent feature space representation based on which the processed audio training signal is generated; (iii) inputting, one at a time, the processed audio training signal and a corresponding original audio signal, from which the audio training signal has been derived, into a discriminator; (iv) judging by the discriminator whether the input audio signal is the processed audio training signal or the original audio signal; and (v) iteratively tuning the parameters of the generator until the discriminator can no longer distinguish the processed audio training signal from the original audio signal.

In some embodiments, steps (i) to (v) may be performed in the perceptually weighted domain.

In accordance with a second aspect of the present disclosure there is provided a method for training a generator in a Generative Adversarial Network (GAN) setting comprising a generator and a discriminator, the generator comprising an encoder stage and a decoder stage, each including multiple layers with one or more filters in each layer, the last layer of the encoder stage mapping to a latent feature space representation comprising a plurality of elements along a channel dimension and a time dimension. The method may include the step of (a) inputting an audio training signal into the generator. The method may further include the step of (b) generating, by the generator, a processed audio training signal based on the audio training signal by applying time and channel recurrence to the latent feature space representation of the audio training signal to obtain a modified latent feature space representation based on which the processed audio training signal is generated. The method may further include the step of (c) inputting, one at a time, the processed audio training signal and a corresponding original audio signal, from which the audio training signal has been derived, into the discriminator. The method may further include the step of (d) judging by the discriminator whether the input audio signal is the processed audio training signal or the original audio signal And the method may include the step of (e) iteratively tuning the parameters of the generator until the discriminator can no longer distinguish the processed audio training signal from the original audio signal.

In some embodiments, steps (a) to (e) may be performed in the perceptually weighted domain.

In some embodiments, in at least one layer of the encoder stage and at least one layer of the decoder stage a non-linear operation may be performed including one or more of ReLU, PReLU, LReLU, eLU and SeLU.

In some embodiments, the generator may further include a non-strided transposed convolutional layer as an output layer following a last layer of the decoder stage.

In some embodiments, one or more skip connections may exist between respective homologous layers of the encoder stage and the decoder stage of the generator.

In some embodiments, the generator may further include a recurrent unit subsequent to the last layer of the encoder stage for applying the time and channel recurrence to the latent feature space representation.

In some embodiments, the recurrent unit may include one or more instances of a time recurrent neural network and one or more instances of a channel recurrent neural network.

In some embodiments, each of the one or more instances of the time recurrent neural network may process a series of elements of the plurality of elements comprised in the latent feature space representation along the time dimension, and each of the one or more instances of the channel recurrent neural network may process a series of elements of the plurality of elements comprised in the latent feature space representation along the channel dimension.

In some embodiments, the time recurrent neural network and the channel recurrent neural network each may include two or more $L_{RNN}$ layers and M hidden activations, wherein M is a natural number $\geq 1$.

In some embodiments, outputs of the one or more instances of the time recurrent neural network and outputs of the one or more instances of the channel recurrent neural network may be concatenated along the channel dimension, followed by mapping to the modified latent feature space representation using a linear layer.

In some embodiments, prior to concatenation, the outputs of the one or more instances of the time recurrent neural network may be stacked and the outputs of the one or more instances of the channel recurrent neural network may be transposed and stacked.

In some embodiments, the recurrent neural networks may be long short-term memories or gated recurrent units.

In some embodiments, a random noise vector z may be applied to the modified latent feature space representation for modifying audio.

In accordance with a third aspect of the present disclosure there is provided an apparatus for generating a processed audio signal, wherein the apparatus includes a deep-learning-based generator, the generator comprising an encoder stage and a decoder stage, each including multiple layers with one or more filters in each layer, the last layer of the encoder stage mapping to a latent feature space representation comprising a plurality of elements along a channel dimension and a time dimension. The generator may be configured to (a) process an input audio signal. The generator may further be configured to (b) map a time segment of the audio signal to the latent feature space representation, using the encoder stage. The generator may further be configured to (c) apply time and channel recurrence to the latent feature space representation to obtain a modified latent feature space representation. And the generator may be configured to (d) output, from the decoder stage, a processed audio signal based on the modified latent feature space representation.

In some embodiments, the apparatus may further include a receiver for receiving an audio bitstream including the audio signal.

In some embodiments, the apparatus may further include a core decoder for core decoding the audio bitstream to obtain the audio signal.

In some embodiments, the apparatus may be configured to generate the processed audio signal in a perceptually weighted domain.

In some embodiments, the apparatus may further include a demultiplexer for demultiplexing the audio bitstream, wherein the audio bitstream may include metadata indicative of a mask to be applied for converting the processed audio signal from the perceptually weighted domain to an original signal domain.

In accordance with a fourth aspect of the present disclosure there is provided a computer program product comprising a computer-readable storage medium with instructions adapted to cause the device to carry out a method of processing an audio signal using a deep-learning-based generator, the generator comprising an encoder stage and a decoder stage, each including multiple layers with one or more filters in each layer, the last layer of the encoder stage mapping to a latent feature space representation comprising a plurality of elements along a channel dimension and a time dimension, when executed by a device having processing capability.

In accordance with a fifth aspect of the present disclosure there is provided a computer program product comprising a computer-readable storage medium with instructions adapted to cause the device to carry out a method for training a generator in a Generative Adversarial Network (GAN) setting comprising a generator and a discriminator, the generator comprising an encoder stage and a decoder stage, each including multiple layers with one or more filters in each layer, the last layer of the encoder stage mapping to a latent feature space representation comprising a plurality of elements along a channel dimension and a time dimension, when executed by a device having processing capability.

In accordance with a sixth aspect of the present disclosure there is provided a system of an apparatus for generating a processed audio signal and a Generative Adversarial Network comprising a generator and a discriminator, wherein the system is configured to perform a method of processing an audio signal using a deep-learning-based generator, the generator comprising an encoder stage and a decoder stage, each including multiple layers with one or more filters in each layer, the last layer of the encoder stage mapping to a latent feature space representation comprising a plurality of elements along a channel dimension and a time dimension and/or a method for training a generator in a Generative Adversarial Network (GAN) setting comprising a generator and a discriminator, the generator comprising an encoder stage and a decoder stage, each including multiple layers with one or more filters in each layer, the last layer of the encoder stage mapping to a latent feature space representation comprising a plurality of elements along a channel dimension and a time dimension.

In accordance with a seventh aspect of the present disclosure there is provided a system of an apparatus for generating an audio signal and encoding the audio signal in an audio bitstream and an apparatus for generating a processed audio signal.

In accordance with an eighth aspect of the present disclosure there is provided a method of processing an audio signal using a deep-learning-based generator, the generator comprising an encoder stage and a decoder stage, each including multiple layers with a plurality of filters in each layer, the plurality of filters in each layer of the decoder stage performing a filtering operation generating a plurality of feature maps, and the last layer of the encoder stage mapping to a latent feature space representation. The method may include the step of (a) inputting the audio signal into the generator for processing the audio signal. The method may further include the step of (b) mapping a time segment of the audio signal to the latent feature space representation, using the encoder stage of the generator. The method may further include the step of (c) upsampling the latent feature space representation using the decoder stage of the generator, wherein at least one layer of the decoder stage applies sinusoidal activation. And the method may include the step of (d) obtaining, as an output from the decoder stage of the generator, a processed audio signal.

In some embodiments, the sinusoidal activation may be implemented by a sinusoidal activation function, the sinusoidal activation function having at least one trainable parameter.

In some embodiments, the sinusoidal activation function may be a parametric squared sine activation function corresponding to $f(x)=x+(1/a) \sin^2(ax+\varphi)$.

In some embodiments, the generator may be a generator trained in a Generative Adversarial Network setting, and values of the at least one trainable parameter of the sinusoidal activation function may have been obtained by training the generator in the Generative Adversarial Network (GAN) setting.

In some embodiments, in step (c) the at least one layer of the decoder stage may apply the sinusoidal activation individually to each of the plurality of feature maps generated in the at least one layer of the decoder stage.

In some embodiments, in step (c) two or more layers of the decoder stage may apply the sinusoidal activation individually to each of the plurality of feature maps generated in each of the two or more layers of the decoder stage.

In some embodiments, the values of the at least one trainable parameter of the sinusoidal activation function for the at least one layer may be represented by a non-uniform distribution, each value in the non-uniform distribution corresponding to a value individually obtained for a respective one of the plurality of feature maps generated in the at least one layer.

In some embodiments, the shape of the non-uniform distribution may be dependent on a content of the audio signal and/or a decoder layer number.

In some embodiments, the audio signal may comprise tonal content.

In some embodiments, in at least one layer of the encoder stage a non-linear operation may be performed including one or more of ReLU, PReLU, LReLU, eLU and SeLU.

In some embodiments, the generator may further include a non-strided transposed convolutional layer as an output layer following a last layer of the decoder stage, and the output layer may apply a tanh activation.

In some embodiments, one or more skip connections may exist between respective homologous layers of the encoder stage and the decoder stage of the generator.

In some embodiments, a random noise vector z may be applied to the latent feature space representation for modifying audio.

In some embodiments, the method may further include the step of receiving an audio bitstream including the audio signal.

In some embodiments, the method may further include core decoding the audio bitstream to obtain the audio signal.

In some embodiments, the method may further include the following steps to be performed before step (a):
(i) inputting an audio training signal into the generator;
(ii) generating, by the generator, a processed audio training signal based on the audio training signal by mapping a time segment of the audio training signal to the latent feature space representation, using the encoder stage of the generator, and upsampling the latent feature space representation, using the decoder stage of the generator, wherein at least one layer of the decoder stage applies sinusoidal activation;
(iii) inputting, one at a time, the processed audio training signal and a corresponding original audio signal, from which the audio training signal has been derived, into a discriminator;
(iv) judging by the discriminator whether the input audio signal is the processed audio training signal or the original audio signal; and
(v) iteratively tuning the parameters of the generator until the discriminator can no longer distinguish the processed audio training signal from the original audio signal.

In some embodiments, the iteratively tuning the parameters of the generator in step (v) may include iteratively tuning the values of the at least one trainable parameter of the sinusoidal activation function.

In some embodiments, the sinusoidal activation function may be a parametric squared sine activation function corresponding to $f(x)=x+(1/a) \sin^2(ax+\varphi)$, and a may be the at least one trainable parameter.

In some embodiments, the at least one layer of the decoder stage may apply sinusoidal activation individually to each of the plurality of feature maps generated in the at least one layer of the decoder stage, and the iteratively tuning the parameters of the generator in step (v) may include iteratively tuning the value of the at least one trainable parameter of the sinusoidal activation function for each of the plurality of feature maps.

In some embodiments, two or more layers of the decoder stage may apply sinusoidal activation individually to each of the plurality of feature maps generated in the two or more layers of the decoder stage, and the iteratively tuning the parameters of the generator in step (v) may include iteratively tuning the value of the at least one trainable parameter of the sinusoidal activation function for each of the plurality of feature maps.

In some embodiments, the audio training signal may comprise tonal content.

In some embodiments, step (i) may further include, prior to inputting the audio training signal, applying a random initialization scheme for initializing values of the at least one trainable parameter of the sinusoidal activation function.

In some embodiments, step (i) may further include, prior to inputting the audio training signal, applying a one-sided exponential initialization scheme for initializing values of the at least one trainable parameter of the sinusoidal activation function, so that a distribution of the values of the trainable parameter of the sinusoidal activation function for the at least one layer substantially corresponds to a one-sided exponential distribution.

In accordance with a ninth aspect of the present disclosure there is provided a method for training a generator in a Generative Adversarial Network (GAN) setting comprising a generator and a discriminator, the generator comprising an encoder stage and a decoder stage, each including multiple layers with a plurality of filters in each layer, the plurality of filters in each layer of the decoder stage performing a filtering operation generating a plurality of feature maps, and the last layer of the encoder stage mapping to a latent feature space representation. The method may include the step of (a) inputting an audio training signal into the generator. The method may further include the step of (b) generating, by the generator, a processed audio training signal based on the audio training signal by mapping a time segment of the audio training signal to the latent feature space representation, using the encoder stage of the generator, and upsampling the latent feature space representation, using the decoder stage of the generator, wherein at least one layer of the decoder stage applies sinusoidal activation. The method may further include the step of (c) inputting, one at a time, the processed audio training signal and a corresponding original audio signal, from which the audio training signal has been derived, into the discriminator. The method may further include the step of (d) judging by the discriminator whether the input audio signal is the processed audio training signal or the original audio signal And the method may include the step of (e) iteratively tuning the parameters of the generator until the discriminator can no longer distinguish the processed audio training signal from the original audio signal.

In some embodiments, the sinusoidal activation may be implemented by a sinusoidal activation function, the sinusoidal activation function having at least one trainable parameter.

In some embodiments, the sinusoidal activation function may be a parametric squared sine activation function corresponding to $f(x)=x+(1/a) \sin^2(ax+\varphi)$, and a may be the at least one trainable parameter.

In some embodiments, the iteratively tuning the parameters of the generator in step (e) may include tuning values of the at least one trainable parameter of the sinusoidal activation function.

In some embodiments, the at least one layer of the decoder stage may apply sinusoidal activation individually to each of the plurality of feature maps generated in the at least one layer of the decoder stage, and the iteratively tuning the parameters of the generator in step (e) may include iteratively tuning the value of the at least one trainable parameter of the sinusoidal activation function for each of the plurality of feature maps.

In some embodiments, two or more layers of the decoder stage may apply sinusoidal activation individually to each of the plurality of feature maps generated in the two or more layers of the decoder stage, and the iteratively tuning the parameters of the generator in step (e) may include iteratively tuning the value of the at least one trainable parameter of the sinusoidal activation function for each of the plurality of feature maps.

In some embodiments, the audio training signal may comprise tonal content.

In some embodiments, step (a) may further include, prior to inputting the audio training signal, applying a random initialization scheme for initializing values of the at least one trainable parameter of the sinusoidal activation function.

In some embodiments, step (a) may further include, prior to inputting the audio training signal, applying a one-sided exponential initialization scheme for initializing values of the at least one trainable parameter of the sinusoidal activation function, so that a distribution of the values of the trainable parameter of the sinusoidal activation function for the at least one layer substantially corresponds to a one-sided exponential distribution.

In some embodiments, in at least one layer of the encoder stage a non-linear operation may be performed including one or more of ReLU, PReLU, LReLU, eLU and SeLU.

In some embodiments, the generator may further include a non-strided transposed convolutional layer as an output layer following a last layer of the decoder stage, wherein the output layer may apply a tanh activation.

In some embodiments, one or more skip connections may exist between respective homologous layers of the encoder stage and the decoder stage of the generator.

In some embodiments, a random noise vector z may be applied to the latent feature space representation for modifying audio.

In accordance with a tenth aspect of the present disclosure there is provided an apparatus for generating a processed audio signal, wherein the apparatus includes a deep-learning-based generator, the generator comprising an encoder stage and a decoder stage, each including multiple layers with a plurality of filters in each layer, the plurality of filters in each layer of the decoder stage performing a filtering operation generating a plurality of feature maps, and the last layer of the encoder stage mapping to a latent feature space representation. The generator may be configured to (a) process an input audio signal. The generator may further be configured to (b) map a time segment of the audio signal to the latent feature space representation, using the encoder stage. The generator may further be configured to (c) upsample the latent feature space representation using the decoder stage, wherein at least one layer of the decoder stage applies sinusoidal activation. And the generator may be configured to (d) output, from the decoder stage, a processed audio signal.

In some embodiments, the apparatus may further include a receiver for receiving an audio bitstream including the audio signal.

In some embodiments, the apparatus may further include a core decoder for core decoding the audio bitstream to obtain the audio signal.

In accordance with an eleventh aspect of the present disclosure there is provided a system of an apparatus for generating a processed audio signal and a Generative Adversarial Network comprising a generator and a discriminator, wherein the system is configured to perform the methods described herein.

In accordance with a twelfth aspect of the present disclosure there is provided a system of an apparatus for generating an audio signal and encoding the audio signal in an audio bitstream and an apparatus for generating a processed audio signal as described herein.

In accordance with further aspects of the present disclosure there are provided computer program products each comprising a computer-readable storage medium with instructions adapted to cause the device to carry out the methods described herein when executed by a device having processing capability.

BRIEF DESCRIPTION OF THE DRAWINGS

Example embodiments of the disclosure will now be described, by way of example only, with reference to the accompanying drawings in which.

DESCRIPTION OF EXAMPLE EMBODIMENTS

Overview

Many audio signals that comprise tonal content, for example speech or music, naturally include periodic functions. In general, in deep-learning based audio processing, during upsampling, a decoder stage of a deep-learning-based generator is employed to convert the compact latent feature space representation back to the signal domain to output the processed audio signal. In case of audio signals that include periodic functions, deep-learning-based generators still lack bias to model such functions.

Methods, apparatus and systems as described herein employ a sinusoidal activation during the upsampling process (e.g., transposed convolution followed by a sinusoidal activation), wherein at least one parameter of the sinusoidal activation function is learnable (trainable). This introduces periodic bias in the model to learn a periodic function that naturally appears in many audio tasks, such as audio generation.

Method of Processing an Audio Signal Using a Deep-Learning-Based Generator

Figure 1:
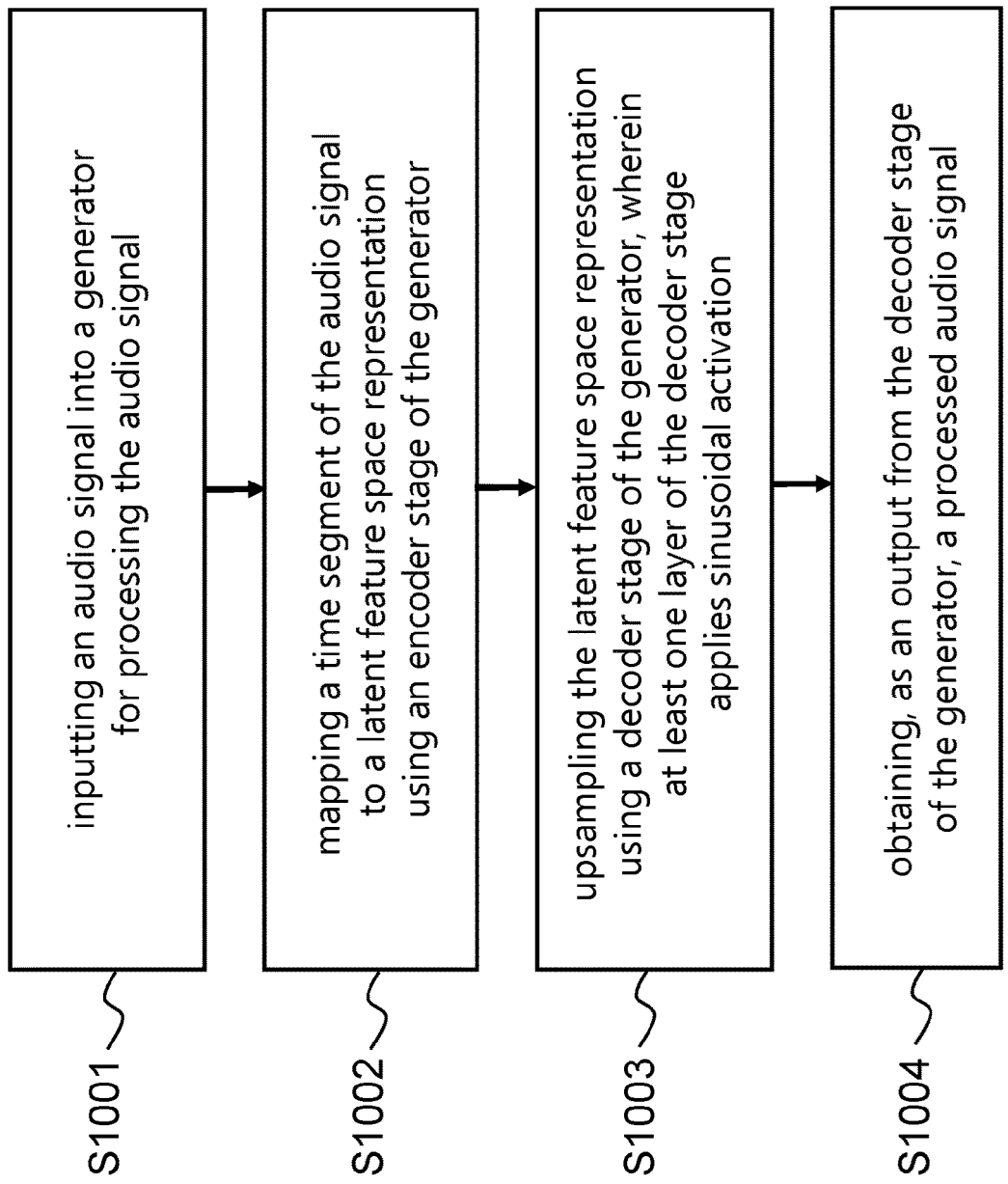
FIG. 1 illustrates an example of a method of processing an audio signal using a deep-learning-based generator.

Referring to the example of FIG. 1, a method of processing an audio signal using a deep-learning-based generator is illustrated. The generator comprises an encoder stage and a decoder stage, each including multiple layers with a plurality of filters in each layer. The plurality of filters in each layer of the decoder stage performs a filtering operation generating a plurality of feature maps. The last layer of the encoder stage maps to a latent feature space representation.

As illustrated in the example of FIG. 1, in step S1001, an audio signal is input into the generator for processing the audio signal. In an embodiment, the audio signal may comprise tonal content. For example, the audio signal may comprise speech and/or music content. Audio signals comprising tonal content naturally include periodic functions.

In an embodiment, prior to step S1001, the method may further include the step of receiving an audio bitstream including the audio signal. The method may then further include core decoding the audio bitstream to obtain the audio signal which is then input into the generator for processing.

In step S1002, a time segment of the audio signal is mapped to the latent feature space representation, using the encoder stage of the generator. In an embodiment, a random noise vector z may be applied to the latent feature space representation for modifying the audio.

In step S1003, the latent feature space representation is upsampled using the decoder stage of the generator, wherein at least one layer of the decoder stage applies sinusoidal activation. The layers of the decoder stage (neural upsampling layers) are typically employed to convert the latent feature space representation back to the signal domain. In this case, during the upsampling process, at least one layer of the decoder stage applies sinusoidal activation (e.g., transposed convolution followed by a sinusoidal activation). This allows to model periodic functions that, for example, are naturally included in audio signals comprising tonal content as will be shown in further detail below.

In an embodiment, the sinusoidal activation may be implemented by a sinusoidal activation function, the sinusoidal activation function may have at least one trainable parameter. This allows to introduce periodic bias to learn/train a periodic function. For a given task, parameters of the sinusoidal activation may be learned/trained, for example, dependent on signal content.

In an embodiment, the sinusoidal activation function may be a parametric squared sine activation function corresponding to $f(x)=x+(1/a)\sin^2(ax+\varphi)$.

In an embodiment, the generator may be a generator trained in a Generative Adversarial Network setting, and values of the at least one trainable parameter of the sinusoidal activation function may have been obtained by training the generator in the Generative Adversarial Network (GAN) setting as described further below.

Figure 2A:
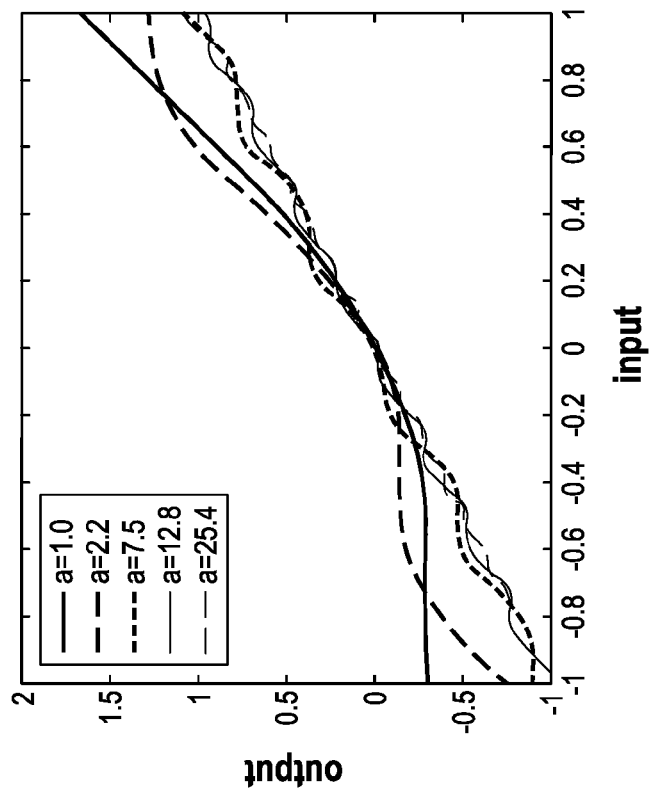
FIG. 2a illustrates examples of a parametric squared sine activation function depending on trained values of the at least one trainable parameter, a, obtained for an audio signal comprising speech content.
Figure 2B:
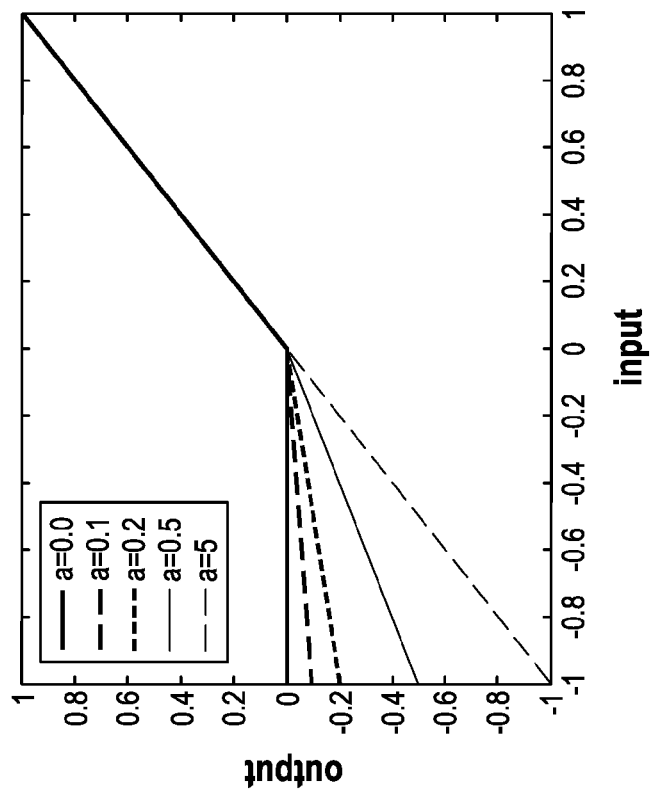
FIG. 2b illustrates examples of typical PReLU activations obtained for an audio signal comprising speech content.

Referring now to the examples of FIGS. 2a and 2b, FIG. 2a illustrates examples of a parametric squared sine activation function depending on trained (learned) values of the at least one trainable parameter, a, obtained for an audio signal comprising speech content. In FIG. 2a, a value of a=1.0 corresponds to the first, uppermost, curve having the least "wiggles". A value of a=2.2 corresponds to the second curve, a value of a=7.5 corresponds to the third curve, a value of a=12.8 corresponds to the fourth curve and a value of a=25.4 corresponds to the fifth, the lowest curve having the highest number of "wiggles".

For reasons of comparison, in FIG. 2b, examples of typical PReLU (parametric rectified linear unit) activations are illustrated which are obtained for the same audio signal as in FIG. 2a. In FIG. 2b, a value of a=0.0 corresponds to the first, uppermost curve, a value of a=0.1 corresponds to the second curve, a value of a=0.2 corresponds to the third curve, a value of a=0.5 corresponds to the fourth curve and a value of a=5 corresponds to the fifth, the lowest curve. The slope of the curves is the same for a value of x=0 or higher (on the x-axis).

The comparison of FIGS. 2a and 2b shows that introducing sinusoidal activations instead of PReLU activations allows to introduce periodic wiggles that enable to model periodic functions, wherein the higher the value of a, the more wiggles are introduced into the sinusoidal activation function.

In an embodiment, in step S1003, the at least one layer of the decoder stage may apply the sinusoidal activation individually to each of the plurality of feature maps generated in the at least one layer of the decoder stage. In a further embodiment, in step S1003, two or more layers of the decoder stage may apply the sinusoidal activation individually to each of the plurality of feature maps generated in each of the two or more layers of the decoder stage. In an embodiment, the values of the at least one trainable parameter of the sinusoidal activation function for the at least one layer may then be represented by a non-uniform distribution, each value in the non-uniform distribution corresponding to a value individually obtained for a respective one of the plurality of feature maps generated in the at least one layer. The shape of the non-uniform distribution may be dependent on a content of the audio signal(s) (that have been used for the training) and/or a decoder layer number as is illustrated by the examples of FIGS. 3a, 3b, 4a and 4b.

Figure 3B:
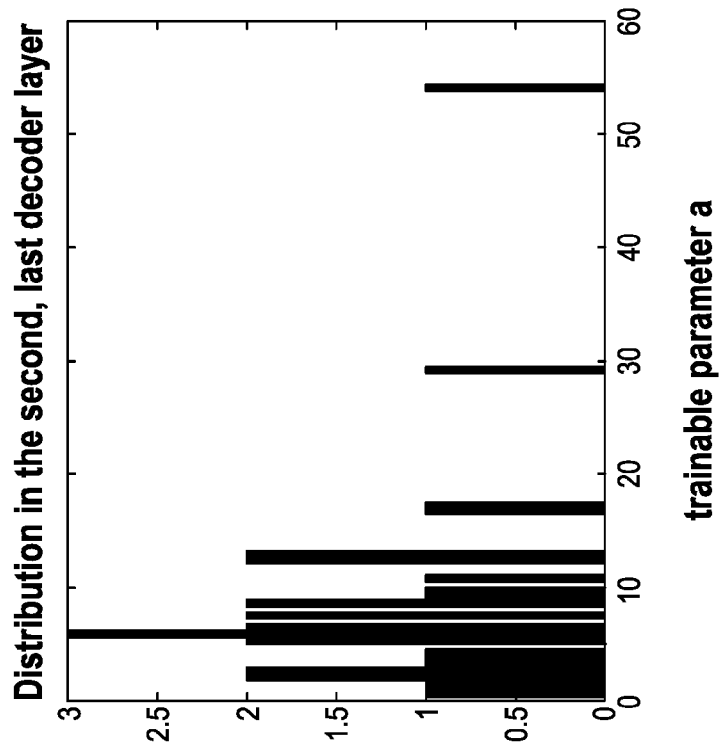
FIG. 3b illustrates an example of a distribution of values of the at least one trainable parameter, a, of a sinusoidal activation function in a second last decoder layer based on training with audio signals comprising speech content.
Figure 3A:
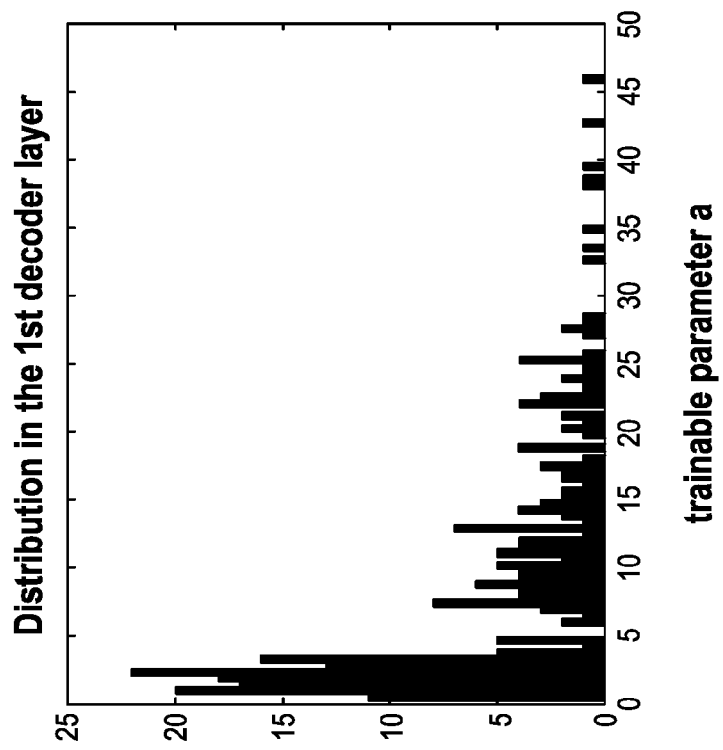
FIG. 3a illustrates an example of a distribution of values of the at least one trainable parameter, a, of a sinusoidal activation function in a first decoder layer based on training with audio signals comprising speech content.

FIGS. 3a and 3b illustrate a non-uniform distribution of the at least one trainable parameter, a, for speech content in a first decoder layer (3a) and a second, last decoder layer (3b). For speech content, for most of the feature maps (bars in the diagram) in the first as well as the second, last decoder layer the value of the at least one trainable parameter, a, is lower, and the corresponding activation approximates a ReLU (rectified linear unit) activation as with lower values of the parameter, a, the number of wiggles in the sinusoidal activation function decreases. It is noted that the reason why the plot in FIG. 3b is sparse is because the number of feature maps is decreasing progressively in the decoder stage.

Figures 4A, 4B:
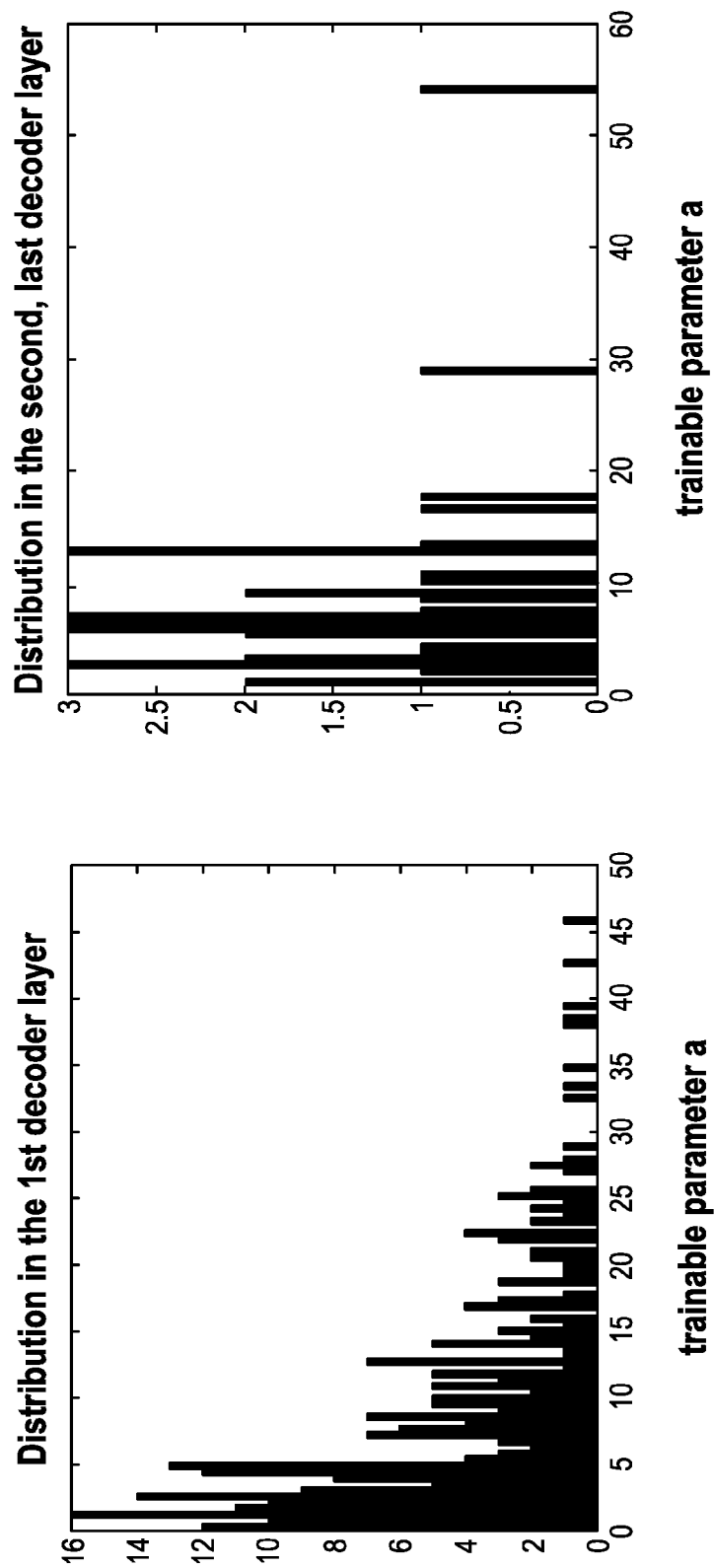
FIG. 4a illustrates an example of a distribution of values of the at least one trainable parameter, a, of a sinusoidal activation function in a first decoder layer based on training with audio signals comprising music content.
FIG. 4b illustrates an example of a distribution of values of the at least one trainable parameter, a, of a sinusoidal activation function in a second last decoder layer based on training with audio signals comprising music content.

FIGS. 4a and 4b illustrate a non-uniform distribution of the at least one trainable parameter, a, for music content in a first decoder layer (4a) and a second, last decoder layer (4b). For music content as compared to speech content, the non-uniform distribution of the values of the at least one trainable parameter, a, has shifted towards higher values. The reason is that music has more tonal components and thus a more periodic bias is required in the generator model.

Referring again to the example of FIG. 1, in step S1004, as an output from the decoder stage of the generator, a processed audio signal is then obtained.

The above-described method may be implemented on a respective apparatus, for example, a decoder. An apparatus for generating a processed audio signal includes a deep-learning-based generator, the generator comprising an encoder stage and a decoder stage, each including multiple layers with a plurality of filters in each layer, the plurality of filters in each layer of the decoder stage performing a filtering operation generating a plurality of feature maps, and the last layer of the encoder stage mapping to a latent feature space representation. The generator may be configured to (a) process an input audio signal. The generator may further be configured to (b) map a time segment of the audio signal to the latent feature space representation, using the encoder stage. The generator may further be configured to (c) upsample the latent feature space representation using the decoder stage, wherein at least one layer of the decoder stage applies sinusoidal activation. And the generator may be configured to (d) output, from the decoder stage, a processed audio signal.

In an embodiment, the apparatus may further include a receiver for receiving an audio bitstream including the audio signal. In an embodiment, the apparatus may further include a core decoder for core decoding the audio bitstream to obtain the audio signal.

Alternatively, or additionally, the above-described method may be implemented on a respective computer program product comprising a computer-readable storage medium with instructions adapted to cause a device to carry out said method.

Alternatively, or additionally, the above-described method may also be implemented by a system of an apparatus for generating an audio signal and encoding the audio signal in an audio bitstream and the above-described apparatus.

Simple Architecture of a Generator

It is noted that the architecture of the deep-learning-based generator is not limited. The above-described method can be implemented by any neural upsampling layers.

Figure 5:
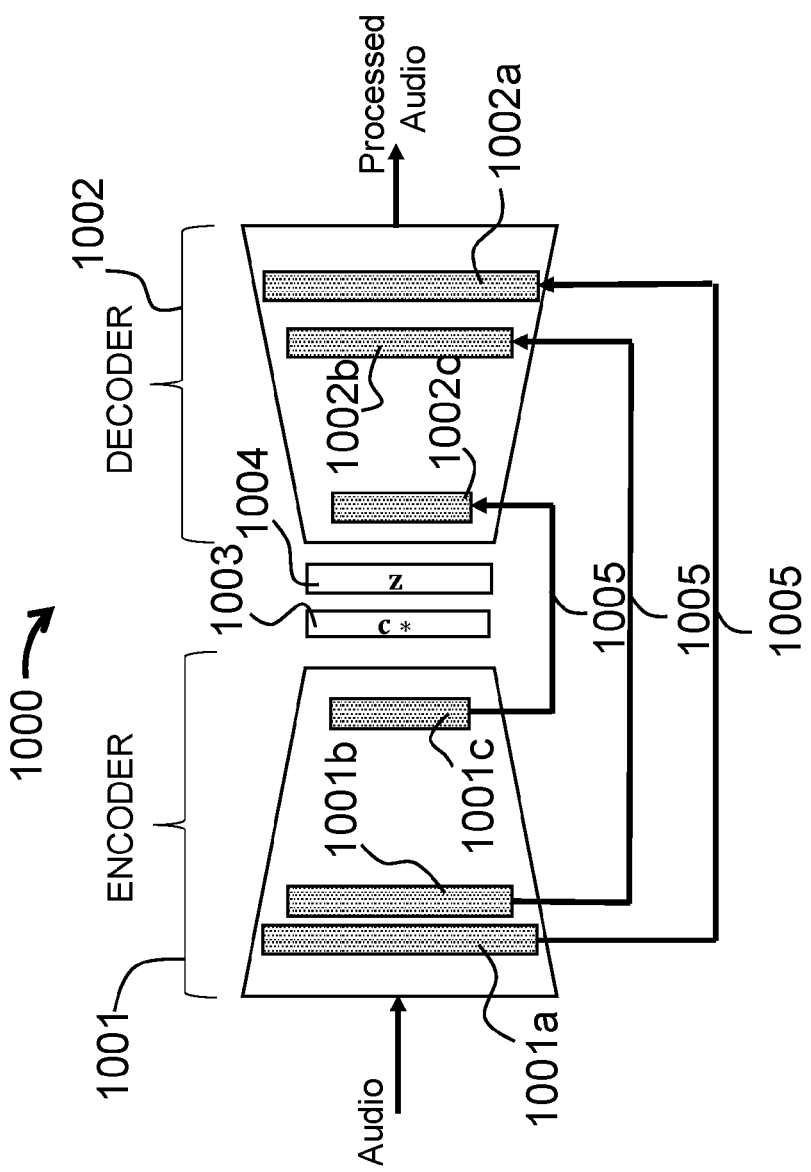
FIG. 5 illustrates schematically an example of a simple architecture of a generator.

Referring now to the example of FIG. 5, a non-limiting example of a simple architecture of a generator is illustrated schematically. The generator, 1000, includes an encoder stage, 1001, and a decoder stage, 1002. The encoder stage, 1001, and the decoder stage, 1002, of the generator, 1000, may be fully convolutional. The decoder stage, 1002, may mirror the encoder stage, 1001. The encoder stage, 1001, as well as the decoder stage, 1002, each may include multiple layers, 1001a, 1001b, 1001c, 1002a, 1002b, 1002c, with a plurality of filters in each layer, wherein the plurality of filters in each layer of the decoder stage may perform a filtering operation generating a plurality of feature maps, and the last layer of the encoder stage, 1001, may map to a latent feature space representation c*, 1003.

That is, the encoder stage, 1001, and the decoder stage, 1002, each may include a number of L layers, with a number of N filters in each layer L. L may be a natural number $\geq 1$ and N may be a natural number $\geq 1$. While the size (also known as kernel size) of the N filters is not limited, the filter size may, however, be the same in each of the L layers, for example, the filter size may be 31. In each layer the number of filters may increase. Each of the filters may operate on the audio signal that is input into each of the layers of the generator with a stride of 2, for example. Thus, a learnable down-sampling by a factor of 2 may be performed in the encoder layers and a learnable up-sampling by a factor of 2 may be performed in the decoder layers. In other words, the encoder stage, 1001, of the generator may include multiple 1D-convolutional layers (without bias terms) with a stride of 2 and the decoder stage, 1002, of the generator may include multiple 1D-transposed convolutional layers (without bias terms) with a stride of 2.

In an embodiment, in at least one layer of the encoder stage, 1001, a non-linear operation may be performed in addition as an activation including one or more of a parametric rectified linear unit (PReLU), a rectified linear unit (ReLU), a leaky rectified linear unit (LReLU), an exponential linear unit (eLU) and a scaled exponential linear unit (SeLU). In the example of FIG. 5, the non-linear operation is based on PReLU.

In an embodiment, in at least one layer of the decoder stage, 1002, a sinusoidal activation may be performed as described above. In the remaining layers of the decoder stage, 1002, except the at least one layer, also a non-linear operation may be performed in addition as an activation including one or more of a parametric rectified linear unit (PReLU), a rectified linear unit (ReLU), a leaky rectified linear unit (LReLU), an exponential linear unit (eLU) and a scaled exponential linear unit (SeLU). In an embodiment, the sinusoidal activation may be implemented by a sinusoidal activation function, the sinusoidal activation function may have at least one trainable parameter.

In an embodiment, the sinusoidal activation function may be a parametric squared sine activation function corresponding to $f(x)=x+(1/a) \sin^2(ax+\varphi)$. Non-limiting examples for the phase $\varphi$ may include $\varphi=0$, in which case the activation function becomes $f(x)=x+(1/a) \sin^2(ax)$, or $\varphi=90°$, in which case the activation function becomes $f(x)=x+(1/a) \cos^2(ax)$.

In an embodiment, the at least one layer of the decoder stage, 1002, may apply the sinusoidal activation individually to each of the plurality of feature maps generated in the at least one layer of the decoder stage, 1002. In a further embodiment, two or more layers of the decoder stage, 1002, may apply the sinusoidal activation individually to each of the plurality of feature maps generated in each of the two or more layers of the decoder stage, 1002. The values of the at least one trainable parameter of the sinusoidal activation function for the at least one layer may then be represented by a non-uniform distribution as described above, each value in the non-uniform distribution corresponding to a value individually obtained for a respective one of the plurality of feature maps generated in the at least one layer or the two or more layers. The shape of the non-uniform distribution may be dependent on a content of the audio signal and/or a decoder layer number, 1002a, 1002b, 1002c.

The generator, 1000, may further include, in an embodiment, a non-strided (stride=1) transposed convolutional layer as an output layer following a last layer, 1002a, of the decoder stage, 1002. The output layer may, for example, include N=1 filters in case of a mono audio signal and, for example, N=2 filters for a stereo audio signal as an example of a multi-channel audio signal. The filter size may be 31. In the output layer, the activation may be based on a tanh operation, tanh(x) activation, as the audio signal output from the decoder stage, 1002, needs to be restricted to +1 and −1.

As illustrated in the example of FIG. 5, in an embodiment, one or more skip connections, 1005, may exist between respective homologous layers of the encoder stage, 1001, and the decoder stage, 1002, of the generator, 1000. In this, the latent feature space representation c*, 1003, may be bypassed preventing loss of information. The skip connections, 1005, may be implemented using one or more of concatenation and signal addition. Due to the implementation of skip connections, 1005, the number of filter outputs may be "virtually" doubled.

In an embodiment, a random noise vector z, 1004, may further be applied to the latent feature space representation c*, 1003, for modifying audio.

Architecture of the Discriminator

The architecture of the discriminator may have the same structure as the encoder stage of the generator. In other words, the discriminator architecture may mirror the structure of the encoder stage of the generator.

That is, the discriminator may include multiple layers with a plurality of filters in each layer. That is, the discriminator may include a number of L layers, with a number of N filters in each layer L. L may be a natural number ≥1 and N may be a natural number ≥1. While the size (also known as kernel size) of the N filters is not limited, the filter size may, however, be the same in each of the L layers, for example, the filter size may be 31. In each layer the number of filters may increase. Each of the filters may operate on the audio signal input into each of the layers of the discriminator with a stride of 2, for example. In other words, the discriminator may include multiple 1D-convolutional layers (without bias terms) with a stride of 2. A non-linear operation performed in at least one of the layers of the discriminator may include LReLU. Prepending, the discriminator may include an input layer. The input layer may be a non-strided convolutional layer (stride=1 implying non-strided). The discriminator may further include an output layer. The output layer may have N=1 filters (the discriminator makes a single real/fake judgement) having a filter size of 1. In this, the filter size of the output layer may be different from the filter size of the discriminator layers. The output layer may thus be a one-dimensional (1D) convolution layer that does not down-sample hidden activations. This means that the filter in the output layer may operate with a stride of 1 while all previous layers of the discriminator may use a stride of 2. The activation in the output layer may be different from the activation in the at least one of the discriminator layers. The activation may be sigmoid. However, if a least squares training approach is used, sigmoid activation may not be required and is therefore optional.

Method for Training a Generator in a Generative Adversarial Network (GAN) Setting In an embodiment, the generator may be a generator trained in a Generative Adversarial Network setting (GAN setting). A GAN setting generally includes the generator G and a discriminator D which are trained by an iterative process. During training in the Generative Adversarial Network setting, the generator G generates a processed audio training signal x* by mapping a time segment of an audio training signal to a latent feature space representation, using the encoder stage, and upsampling the latent feature space representation, using the decoder stage, wherein at least one layer of the decoder stage applies sinusoidal activation. The audio training signal may be derived from an original audio signal x that has been coded and decoded, respectively. In an embodiment, a random noise vector may be applied to the latent feature space representation. The random noise vector may, however, be set to z=0. For coding artifact reduction setting the random noise vector to z=0 may yield the best results. Alternatively, training may be performed without the input of a random noise vector z.

The generator G tries to output a processed audio training signal x* that is indistinguishable from the original audio signal x. The discriminator D is one at a time fed with the generated processed audio training signal x* and the original audio signal x and judges in a fake/real manner whether the input signal is the processed audio training signal x* or the original audio signal x. In this, the discriminator D tries to discriminate the original audio signal x from the processed audio training signal x*. During the iterative process, the generator G then tunes its parameters to generate a better and better processed audio training signal x* as compared to the original audio signal x and the discriminator D learns to better judge between the processed audio training signal x* and the original audio signal x. This adversarial learning process may be described by the following equation (1):

$$\min_G \max_D V(D, G) = \mathbb{E}_{x \sim p_{data}(x)}[\log D(x)] + \mathbb{E}_{z \sim p_z(z)}[\log(1 - D(G(z)))] \quad (1)$$

It shall be noted that the discriminator D may be trained first in order to train the generator G in a final step. Training and updating the discriminator D may involve maximizing the probability of assigning high scores to the original audio signal x, and low scores to the processed audio training signal x*. The goal in training of the discriminator D may be that the original audio signal (uncoded) is recognized as real while the processed audio training signal x* (generated) is recognized as fake. While the discriminator D is trained and updated, the parameters of the generator G may be kept fixed.

Training and updating the generator G may then involve minimizing the difference between the original audio signal x and the generated processed audio training signal x*. The goal in training the generator G may be to achieve that the discriminator D recognizes the generated processed audio training signal x* as real.

Figure 6:
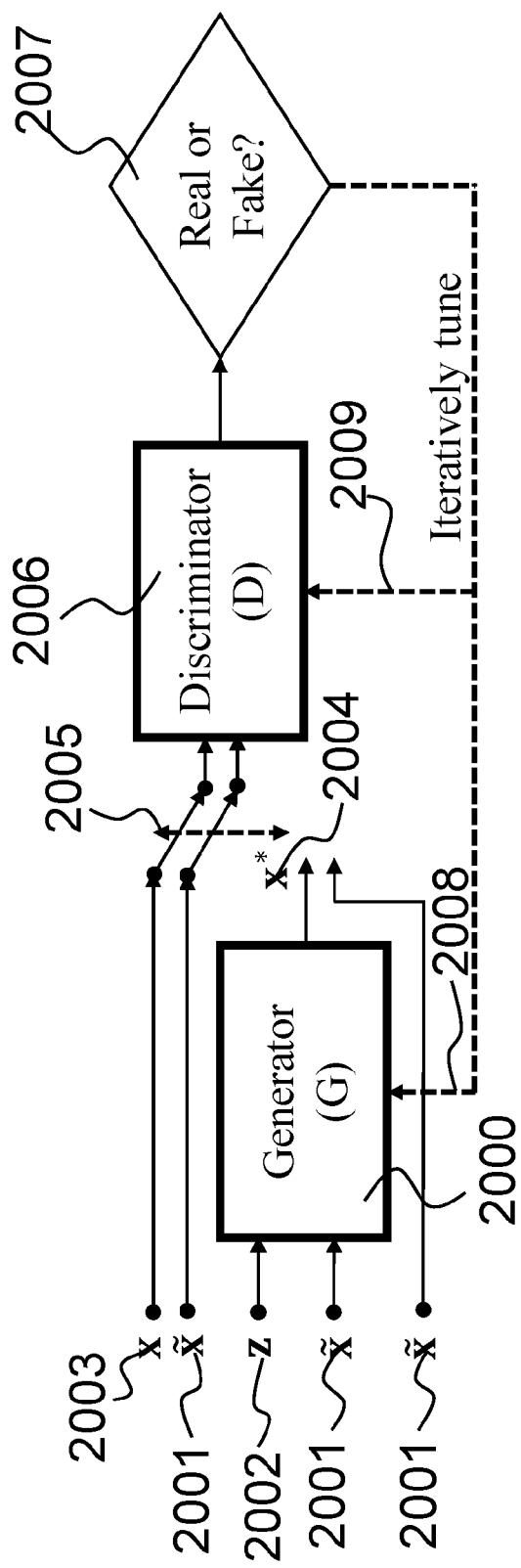
FIG. 6 illustrates an example of a method for training a generator or a discriminator in a Generative Adversarial Network (GAN) setting comprising the generator and the discriminator.

Referring to the example of FIG. 6, a method for training a generator and a method for training a discriminator in a Generative Adversarial Network (GAN) setting is illustrated. Training of the generator G, 2000, may involve the following. An audio training signal x̃, 2001, and optionally a random noise vector z, 2002, may be input into the generator G, 2000. In an embodiment, the random noise vector z, may be set to z=0. Alternatively, training may be performed without the input of a random noise vector z.

In an embodiment, the audio training signal Z, 2001, may comprise tonal content. This allows to train the generator, G, on periodic functions that are naturally included in such audio signals. The audio training signal x̃, 2001, may be obtained by coding and decoding an original audio signal, x, 2003. Based on the input, the generator G, 2000, then generates a processed audio training signal x*, 2004, by mapping a time segment of the audio training signal Z, 2001, to the latent feature space representation, using the encoder stage, and upsampling the latent feature space representation, using the decoder stage, wherein at least one layer of the decoder stage applies sinusoidal activation as described. In an embodiment, the sinusoidal activation may be implemented by a sinusoidal activation function, the sinusoidal activation function may have at least one trainable parameter. In an embodiment, the sinusoidal activation function may be a parametric squared sine activation function corresponding to $f(x)=x+(1/a)\sin^2(ax+\varphi)$, wherein a is the at least one trainable parameter.

One at a time, the original audio signal x, 2003, from which the audio training signal x̃, 2001, has been derived, and the generated processed audio training signal x*, 2004, are input, 2005, into the discriminator D, 2006. As additional information, also the audio training signal x̃, 2001, may be input each time into the discriminator D, 2006. The discriminator D, 2006, then judges, 2007, whether the input data is the processed audio training signal x*, 2004, (fake) or the original audio signal x, 2003 (real). In a next step, the parameters of the generator G, 2000, are then tuned until the discriminator D, 2006, can no longer distinguish the processed audio training signal x*, 2004, from the original audio signal x, 2003. This may be done in an iterative process, 2008.

In an embodiment, the iteratively tuning, 2008, the parameters of the generator, G, 2000, may include iteratively tuning the values of the at least one trainable parameter of the sinusoidal activation function as described above. If the sinusoidal activation function is implemented as a parametric squared sine activation function corresponding to $f(x)=x+(1/a)\sin^2(ax+\varphi)$, the values of a may be tuned (learned/trained).

In an embodiment, the at least one layer of the decoder stage may apply sinusoidal activation individually to each of the plurality of feature maps generated in the at least one layer of the decoder stage, and the iteratively tuning, 2008, the parameters of the generator, G, 2000, may include iteratively tuning the value of the at least one trainable parameter of the sinusoidal activation function for each of the plurality of feature maps.

In an embodiment, two or more layers of the decoder stage may apply sinusoidal activation individually to each of the plurality of feature maps generated in the two or more layers of the decoder stage, and the iteratively tuning, 2008, the parameters of the generator, G, 2000, may include iteratively tuning the value of the at least one trainable parameter of the sinusoidal activation function for each of the plurality of feature maps.

Judging by the discriminator D, 2006, may be based on one or more of a perceptually motivated objective function as according to the following equation (2):

$$\mathcal{L}_G = \frac{1}{2}\mathbb{E}_{z\sim p_z(z),\tilde{x}\sim p_{data}(\tilde{x})}\left[(D(x^*,\tilde{x})-1)^2\right] + \lambda\|x^*-x\|_1 + \mu\frac{1}{M}\sum_{m=1}^{M}L_{sc}^m(x,x^*) + \vartheta\frac{1}{M}\sum_{m=1}^{M}L_{mag}^m(x,x^*) \quad (2)$$

As can be seen from the first term in equation (2), a conditioned Generative Adversarial Network setting has been applied by inputting the audio training signal x̃ as additional information into the discriminator.

The last two terms in the above equation (2) may be referred to as a multi-resolution STFT loss term. The multi-resolution STFT loss may be said to be the sum of different STFT-based loss functions using different STFT parameters. $L_{sc}^m$ (spectral convergence loss) and $L_{mag}^m$ (log-scale STFT magnitude loss) may apply the STFT-based loss at M different resolutions with number of FFT bins∈ {512, 1024, 2048}, hop sizes∈ {50, 120, 240}, and lastly window lengths∈ {240, 600, 1200}, respectively. Results showed that for handling general audio (i.e. any content type), the multi-resolution STFT loss term provides quality improvement.

The second term in equation (2) is a 1-norm distance scaled by the factor lambda λ. The value of lambda may be chosen of from 10 to 100 depending on the application and/or signal length that is input into the generator. For example, lambda may be chosen to be λ=100. Furthermore, the scaling (λ and ϑ) for the multi-resolution STFT loss term may be set to the same value as lambda.

Referring again to the example of FIG. 6, in an embodiment, prior to inputting the audio training signal x̃, 2001, into the generator, G, 2000, a random initialization scheme for initializing values of the at least one trainable parameter of the sinusoidal activation function may be applied.

Figure 7:
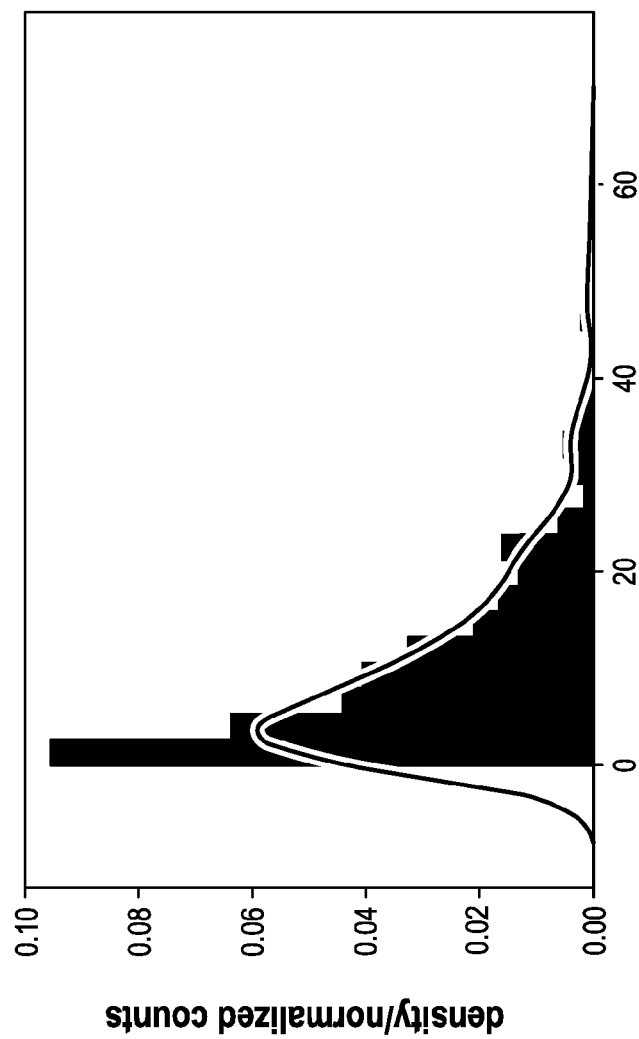
FIG. 7 illustrates an example of a one-sided exponential initialization scheme for initializing values of the at least one trainable parameter of the sinusoidal activation function.

Alternatively, in an embodiment, prior to inputting the audio training signal z̃, 2001, into the generator, G, 2000, a one-sided exponential initialization scheme for initializing values of the at least one trainable parameter of the sinusoidal activation function may be applied, so that a distribution of the values of the trainable parameter of the sinusoidal activation function for the at least one layer may substantially correspond to a one-sided exponential distribution. An example of a one-sided exponential initialization scheme is illustrated in FIG. 7. Applying the one-sided exponential initialization scheme as compared to random initialization allows to speed up training in that the values of the at least one trainable parameter of the sinusoidal activation function are learned faster.

Referring again to the example of FIG. 6, training of the discriminator D, 2006, may follow the same general process as described above for the training of the generator G, 2000, except that in this case the parameters of the generator G, 2000, may be fixed while the parameters of the discriminator D, 2006, may be varied, 2009. The training of the discriminator D, 2006, may be described by the following equation (3) that enables the discriminator D, 2006, to determine the processed audio training signal x*, 2004, as fake:

$$\min_D V_{LS-GAN}(D) = \frac{1}{2}\mathbb{E}_{x,\tilde{x}\sim p_{data}(x,\tilde{x})}\left[(D(x,\tilde{x})-1)^2\right] + \frac{1}{2}\mathbb{E}_{z\sim p_z(z),\tilde{x}\sim p_{data}(\tilde{x})}\left[D(x^*,\tilde{x})^2\right] \quad (3)$$

In the above case, also the least squares approach (LS) and a conditioned Generative Adversarial Network setting has been applied by inputting the audio training signal x̃ as additional information into the discriminator D, 2006.

Besides the least squares approach, also other training methods may be used for training the generator and the discriminator in a Generative Adversarial Network setting. The present disclosure is not limited to a particular training method. Alternatively, or additionally, the so-called Wasserstein approach may be used. In this case, instead of the least squares distance the Earth Mover Distance also known as Wasserstein Distance may be used. In general, different training methods make the training of the generator and the discriminator more stable. The kind of training method applied, does, however, not impact the architecture of the generator.

The implementation of sinusoidal activation is not limited to the above-described methods, apparatus and systems. In the following, another method of processing an audio signal using a deep-learning-based generator will be described, where sinusoidal activation may additionally be applied. In the following example, the generator additionally includes a recurrent unit.

Method of Processing an Audio Signal Using a Deep-Learning-Based Generator, the Generator Including a Recurrent Unit In audio, especially music, certain harmonic correlation or similarity can be observed in the spectrograms along both frequency and time axis. Hence, if an audio signal is input into a deep-learning-based generator, at the bottleneck which represents a latent feature space, it can be expected that correlation exists across both its two dimensions which are channels vs. time. This aspect can be exploited to increase the signal modeling efficiency and at the same time reduce the required computational load of a deep-learning-based generator by extracting patterns from this two-dimensional representation using time and channel recurrence applied by, for example, Recurrent Neural Networks (RNNs).

Figure 8:
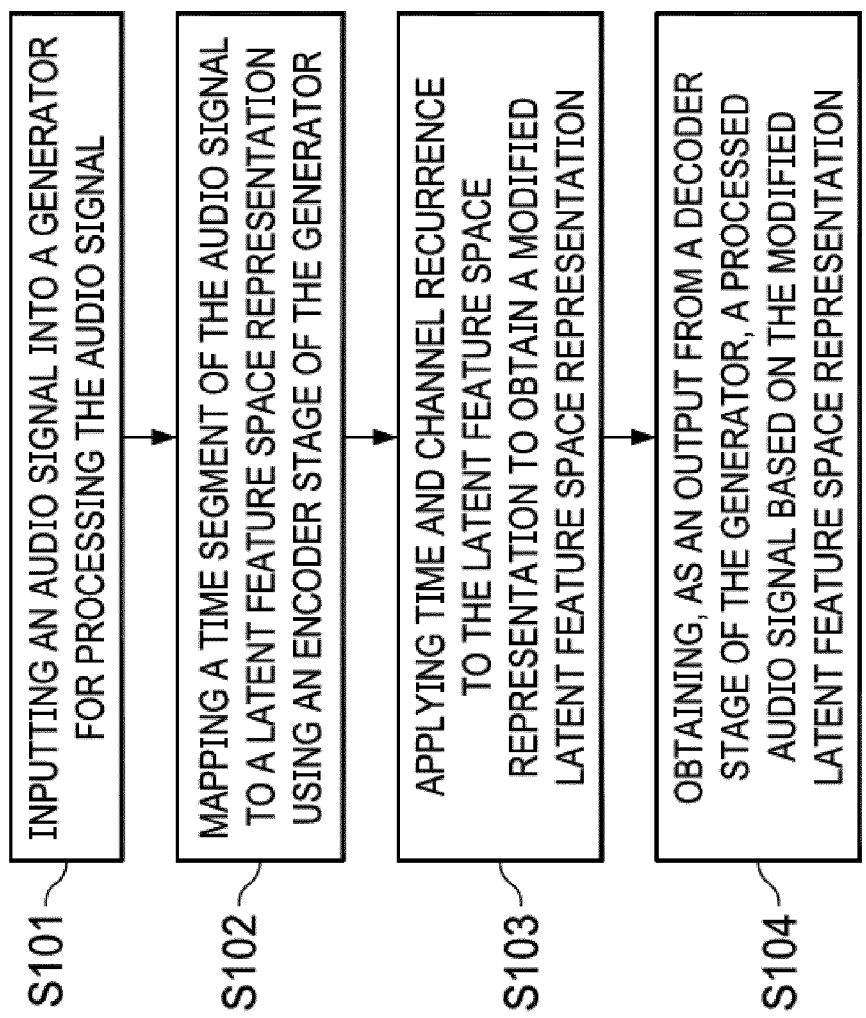
FIG. 8 illustrates another example of a method of processing an audio signal using a deep-learning-based generator, the generator additionally including a recurrent unit for applying time and channel recurrence to the latent feature space representation.

Referring to the example of FIG. 8, a method of processing an audio signal using a deep-learning-based generator is illustrated. As detailed further below, the generator comprises an encoder stage and a decoder stage, each including multiple layers with one or more filters in each layer, the last layer of the encoder stage of the generator maps to a latent feature space representation comprising a plurality of elements along a channel dimension and a time dimension.

As illustrated in the example of FIG. 8, in step S101, an audio signal is input into the generator for processing the audio signal. The audio signal may be a mono-channel signal or a multi-channel signal. In an embodiment, the audio signal may be received as a bitstream including the audio signal. In other words, in an embodiment, the method may further include receiving an audio bitstream including the audio signal. The audio signal included in the bitstream may be a coded audio signal. In an embodiment, the method may thus further include core decoding the audio bitstream to obtain the audio signal. The codec applied is not limited, for example, AAC family codecs, such as HE-AAC and USAC (i.e. xHE-AAC) may be applied. The received audio bitstream may, for example, also be in AC-4 format.

In step S102, a time segment of the audio signal is mapped to the latent feature space representation using the encoder stage of the generator. The latent feature space representation represents a two-dimensional representation in terms of channels and time. It is to be noted that the term "channels" may refer to feature maps, but also to the outputs of a convolutional filtering operation. Accordingly, any type of codec may be applied to the audio signal, and the audio signal may comprise any type of content (e.g., speech, music, applause, etc.).

In step S103, time and channel recurrence are applied to the latent feature space representation to obtain a modified latent feature space representation. By applying time and channel recurrence to the latent feature space representation, it is exploited that certain harmonic correlations or similarities can be observed along the frequency and time axis in spectrograms of audio signals, especially music, which are also reflected in the latent feature space representation along the dimensions of channels and time. Time-channel recurrence thus captures both, temporal and channel dependencies. The term "modified" thus refers to the latent feature space representation as modified by applying time and channel recurrence.

In step S104, as an output from the decoder stage of the generator, a processed audio signal is obtained based on the modified latent feature space representation. In addition, especially, if the audio signal input into the generator in step S101 comprises tonal content, at least one layer of the decoder stage may apply sinusoidal activation, as described above.

In an embodiment, the above recited method steps may be performed in a perceptually weighted domain. An example of a perceptually weighted domain is described in U.S. Provisional Application No. 63/092,118 entitled "Method and Apparatus for Processing of Audio using a Neural Network" filed on Oct. 15, 2020, which is hereby incorporated by reference in its entirety.

In this case, a perceptually weighted audio signal may be input into the generator in step S101. The perceptually weighted audio signal may be obtained by converting of the received audio signal from an original signal domain (i.e. the signal domain the audio signal is received in) into the perceptually weighted domain by applying a mask or a masking curve indicating masking thresholds estimated based on a psychoacoustic model. A mask or masking curve defines the level of just noticeable distortion (JND) that the human auditory system can detect for a given stimulus signal. Accordingly, performing the method in the perceptually weighted domain minimizes the audible impact of adding white noise (spectrally flat noise) to a perceptual domain audio signal, since the noise will be shaped to minimize audibility when the audio signal is converted back to its original signal domain.

Figure 9:
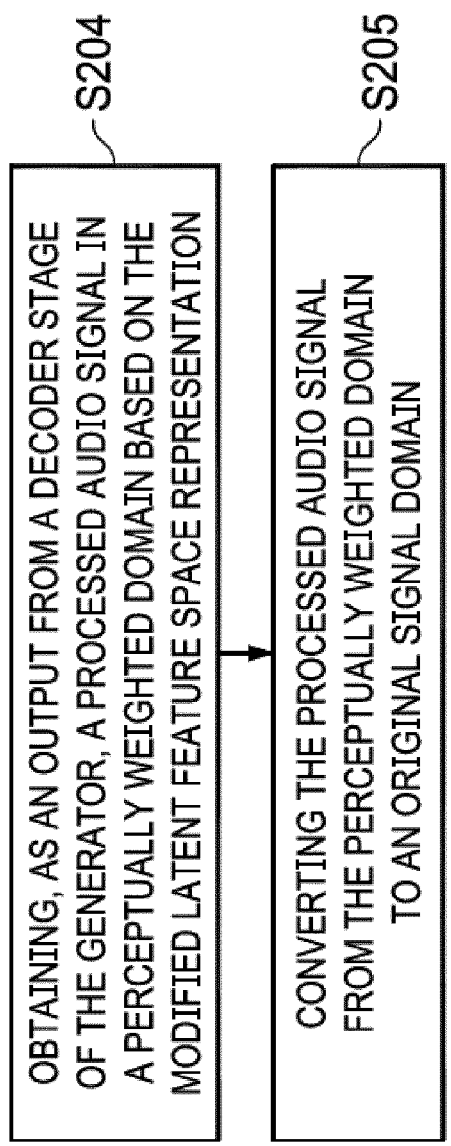
FIG. 9 illustrates yet another example of a method of processing an audio signal using a deep-learning-based generator, the generator additionally including a recurrent unit for applying time and channel recurrence to the latent feature space representation.

Referring to the example of FIG. 9, which illustrates another example of a method of processing an audio signal using a deep-learning-based generator, in step S204, a processed audio signal in the perceptually weighted domain may then be obtained as an output from the decoder stage of the generator. Also in this case, at least one layer of the decoder stage may apply sinusoidal activation as described above. For example, the processed audio signal in the perceptually weighted domain may be obtained as described in FIG. 8. In this case, the method may further include the step S205 of converting the processed audio signal from the perceptually weighted domain into the original signal domain. The expression "original signal domain" refers to the domain of the audio signal prior to conversion of the audio signal to the perceptually weighted domain, or in other words the signal domain that the audio signal is received/obtained in. In an embodiment, converting the processed audio signal from the perceptually weighted domain to the original signal domain may be based on applying an inverse mask to the processed audio signal in the perceptually weighted domain, the inverse mask being calculated based on the psychoacoustic model. The inverse mask may be, for example, the inverse of the mask or masking curve applied to convert the audio signal from the original signal domain to the perceptually weighted domain. Alternatively, or additionally, in an embodiment, metadata indicative of the mask (or masking curve) to be applied for converting the processed audio signal from the perceptually weighted domain to the original signal domain may further be included in the received bitstream.

The above-described methods may be implemented on a respective apparatus, for example, a decoder. An apparatus for generating a processed audio signal includes a deep-learning-based generator, the generator comprising an encoder stage and a decoder stage, each including multiple layers with one or more filters in each layer, the last layer of the encoder stage mapping to a latent feature space representation comprising a plurality of elements along a channel dimension and a time dimension. The generator is configured to: (a) process an input audio signal; (b) map a time segment of the audio signal to the latent feature space representation, using the encoder stage; (c) apply time and channel recurrence to the latent feature space representation to obtain a modified latent feature space representation; and (d) output, from the decoder stage, a processed audio signal based on the modified latent feature space representation.

In an embodiment, the apparatus may further include a receiver for receiving an audio bitstream including the audio signal. In an embodiment, the apparatus may further include a core decoder for core decoding the audio bitstream to obtain the audio signal. In an embodiment, the apparatus may be configured to generate the processed audio signal in a perceptually weighted domain. In an embodiment, the apparatus may further include a demultiplexer for demultiplexing the audio bitstream, wherein the audio bitstream may include metadata indicative of a mask to be applied for converting the processed audio signal from the perceptually weighted domain to an original signal domain.

Alternatively, or additionally, the above-described method may be implemented on a respective computer program product comprising a computer-readable storage medium with instructions adapted to cause a device to carry out said method.

Alternatively, or additionally, the above-described method may also be implemented by a system of an apparatus for generating an audio signal and encoding the audio signal in an audio bitstream and the above-described apparatus.

Architecture of a Generator Including a Recurrent Unit

Figure 10:
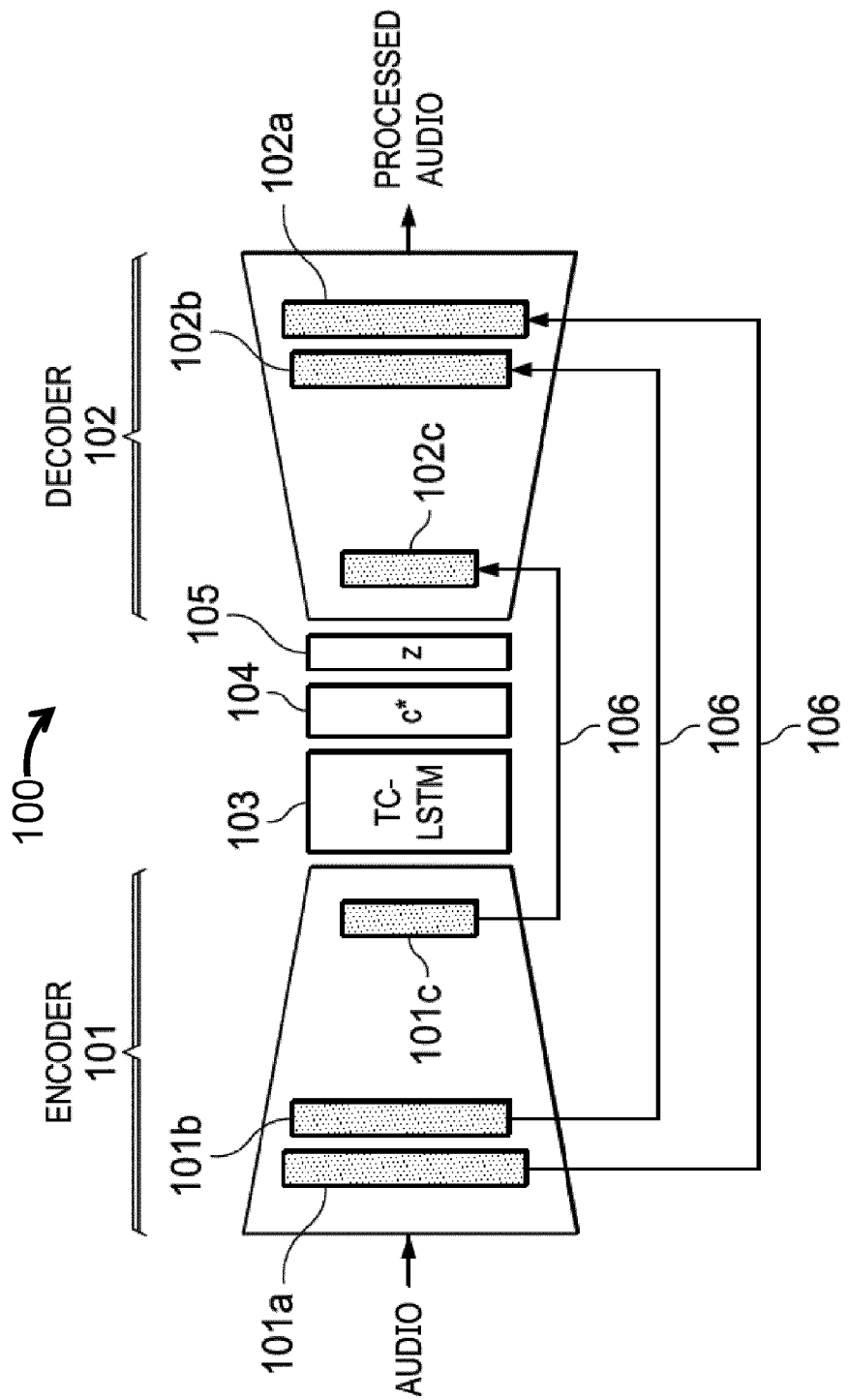
FIG. 10 illustrates schematically another example of the architecture of a generator.

Referring now to the example of FIG. 10, the architecture of a generator is illustrated schematically. The generator, 100, includes an encoder stage, 101, and a decoder stage, 102. The encoder stage, 101, and the decoder stage, 102, of the generator, 100, may be fully convolutional. The decoder stage, 102, may mirror the encoder stage, 101. The encoder stage, 101, as well as the decoder stage, 102, each may include multiple layers, 101a, 101b, 101c, 102a, 102b, 102c, with one or more filters in each layer. That is, the encoder stage, 101, and the decoder stage, 102, each may include a number of L layers, with a number of N filters in each layer L. L may be a natural number ≥1 and N may be a natural number ≥1.

While the size (also known as kernel size) of the N filters is not limited, the filter size may, however, be the same in each of the L layers, for example, the filter size may be 31. In each layer the number of filters may increase. Each of the filters may operate on the audio signal that is input into each of the layers of the generator with a stride of 2, for example. Thus, a learnable down-sampling by a factor of 2 may be performed in the encoder layers and a learnable up-sampling by a factor of 2 may be performed in the decoder layers. In other words, the encoder stage, 101, of the generator may include multiple 1D-convolutional layers (without bias terms) with a stride of 2 and the decoder stage, 102, of the generator may include multiple 1D-transposed convolutional layers (without bias terms) with a stride of 2.

In an embodiment, in at least one layer of the encoder stage, 101, and at least one layer of the decoder stage, 102, a non-linear operation may be performed in addition as an activation including one or more of a parametric rectified linear unit (PReLU), a rectified linear unit (ReLU), a leaky rectified linear unit (LReLU), an exponential linear unit (eLU) and a scaled exponential linear unit (SeLU). In the example of FIG. 3, the non-linear operation is based on PReLU. If sinusoidal activation is to be applied, the activation in at least one layer of the decoder stage, 102, may be implemented by a sinusoidal activation function, wherein the activation in the remaining layer(s) of the decoder stage, 102, remain(s) as described. It is noted that sinusoidal activation may be applied for all layers of the decoder stage in some implementations, except for the output layer.

The generator, 100, may further include, in an embodiment, a non-strided (stride=1) transposed convolutional layer as an output layer following a last layer, 102a, of the decoder stage, 102. The output layer may, for example, include N=1 filters in case of a mono audio signal and, for example, N=2 filters for a stereo audio signal as an example of a multi-channel audio signal. The filter size may be 31. In the output layer, the activation may be different to the activation performed in the at least one of the encoder layers and the at least one of the decoder layers. The activation may be based, for example, on a tanh operation.

As illustrated in the example of FIG. 10, in an embodiment, one or more skip connections, 106, may exist between respective homologous layers of the encoder stage, 101, and the decoder stage, 102, of the generator, 100. In this, a modified latent feature space representation c*, 104, may be bypassed preventing loss of information. The skip connections, 106, may be implemented using one or more of concatenation and signal addition. Due to the implementation of skip connections, 106, the number of filter outputs may be "virtually" doubled. The modified latent feature space representation c*, 104, is obtained by applying time and channel recurrence, 103, to a latent feature space representation which is obtained by the last layer, 101c, of the encoder stage, 101, mapping to said latent feature space representation.

Figure 11:
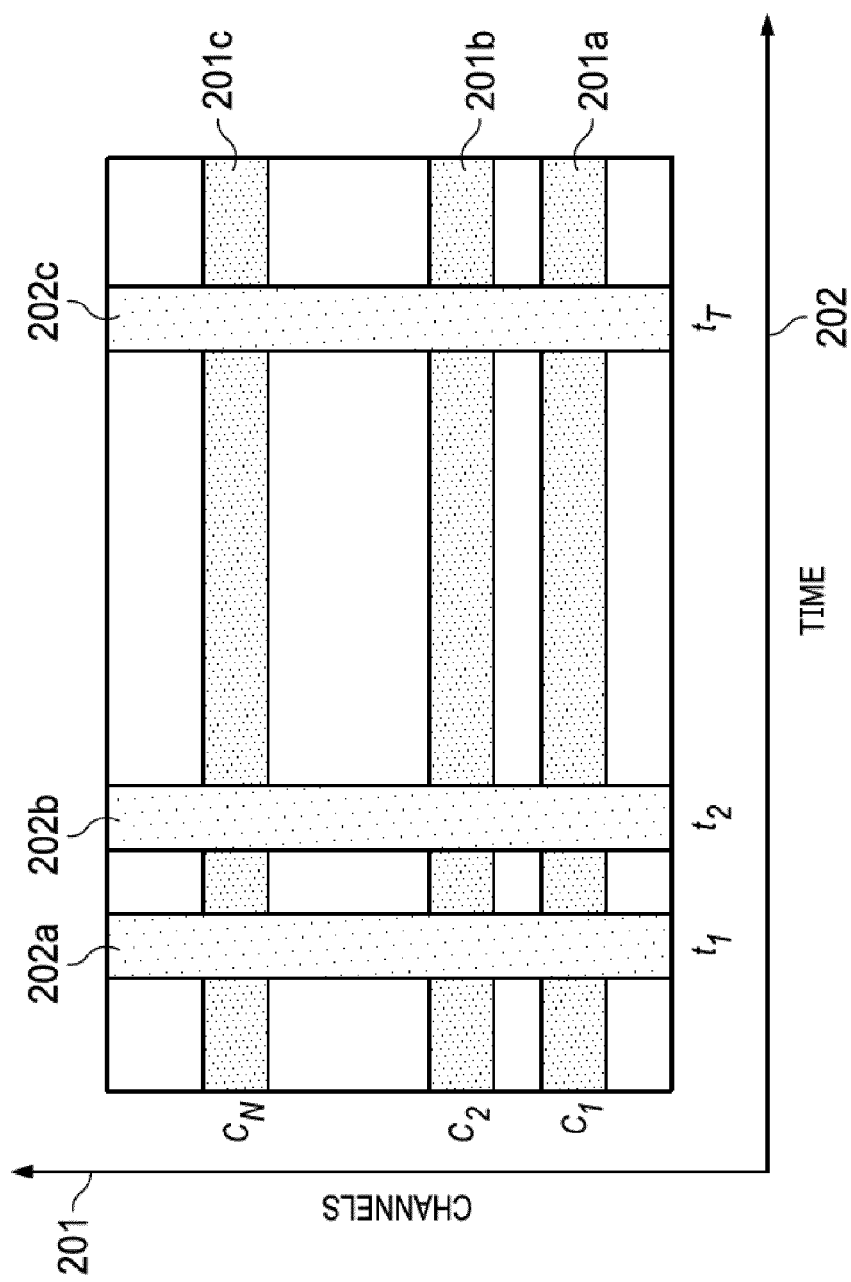
FIG. 11 illustrates schematically an example of a latent feature space representation.

In the example of FIG. 11, a latent feature space representation is illustrated schematically. The latent feature space representation comprises a plurality of elements $c_1$ to $c_N$, 201a, 201b, 201c, along a channel dimension and along a time dimension, $t_1$ to $t_T$, 202a, 202b, 202c, thus representing a two-dimensional feature space in terms of channels, 201, and time, 202.

For example, if the encoder stage of the generator includes 6 1D-convolutional layers with stride of 2 with a kernel size of 31, as described above, and filter numbers of 64, 64, 128, 128, 256, 256, the time dimension at the latent feature space is $16384/2^6=256$ samples, where 16384 is the number of samples fed to the generator, that is the latent feature space dimension is 256 channels (N)×256 time (T). Based on experimental results, setting the dimensions of the latent feature space representation to 256×256 prior to applying time and channel recurrence may yield the best results.

Referring again to the example of FIG. 10, in an embodiment, the generator, 100, may further include a recurrent unit, 103, subsequent to the last layer, 101c, of the encoder stage, 101, for applying the time and channel recurrence to the latent feature space representation to obtain the modified latent feature space representation c*, 104. The recurrent unit, 103, will be described in more detail further below. In an embodiment, a random noise vector z, 105, may further be applied to the modified latent feature space representation c*, 104, for modifying audio.

Figure 12:
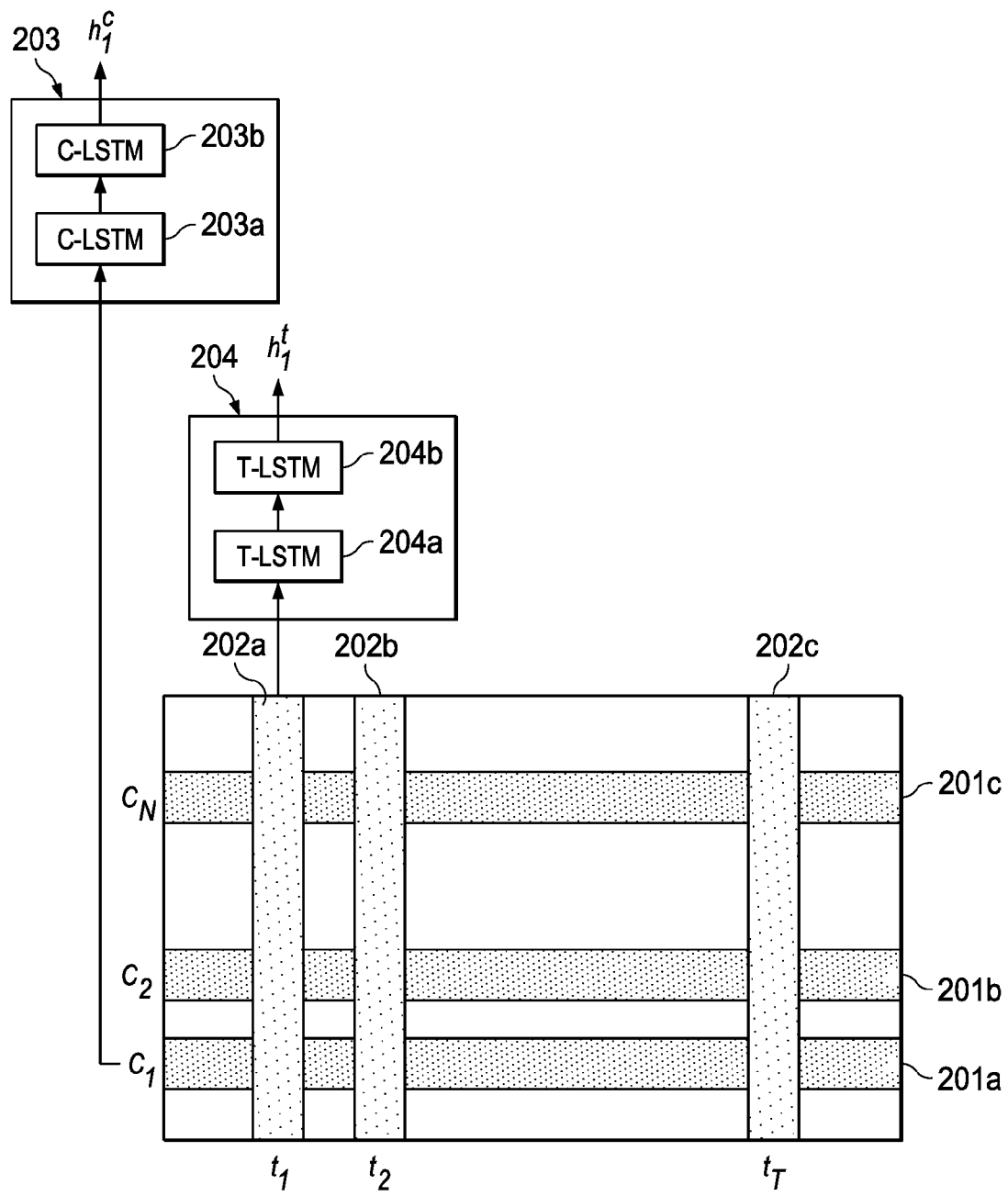
FIG. 12 illustrates schematically an example of applying time and channel recurrence to the latent feature space representation.

Referring now to the example of FIG. 12, the recurrent unit will be described in more detail. As mentioned above, the generator may include a recurrent unit subsequent to the last layer of the encoder stage for applying the time and channel recurrence to the latent feature space representation to obtain a modified latent feature space representation. In an embodiment, the recurrent unit may include one or more instances of a time recurrent neural network, 204, and one or more instances of a channel recurrent neural network, 203.

In an embodiment, each of the one or more instances of the time recurrent neural network, 204, may process a series of elements $t_1$, 202a, of the plurality of elements $t_1$ to $t_T$, 202a, 202b, 202c, comprised in the latent feature space representation along the time dimension, and each of the one or more instances of the channel recurrent neural network, 203, may process a series of elements $c_1$, 201a, of the plurality of elements $c_1$ to $c_N$, 201a, 201b, 201c, comprised in the latent feature space representation along the channel dimension. In an embodiment, the time recurrent neural network, 204, and the channel recurrent neural network, 203, each may include two or more $L_{RNN}$ layers, 203a, 203b, 204a, 204b, and M hidden activations, wherein M may be a natural number ≥1. For example, each recurrent neural network may include $L_{RNN}$=2 layers and M=256 hidden activations (units).

Figure 13:
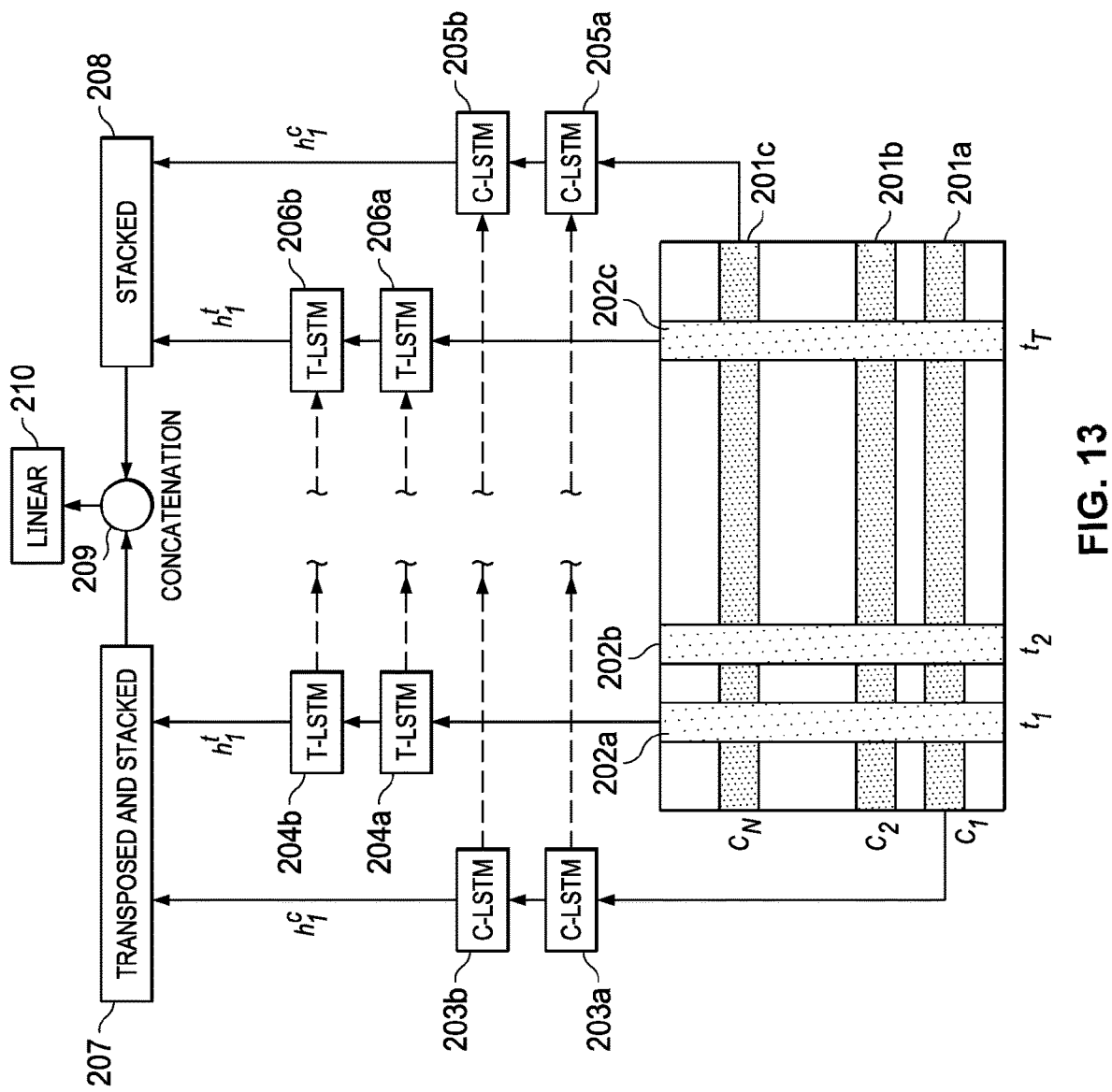
FIG. 13 illustrates schematically another example of applying time and channel recurrence to the latent feature space representation.

Referring now to the example of FIG. 13, in an embodiment, the outputs of the one or more instances of the time recurrent neural network, 204, 206, and the outputs of the one or more instances of the channel recurrent neural network, 203, 205, may be concatenated, 209, along the channel dimension, followed by mapping to the modified latent feature space representation using a linear layer, 210. Prior to concatenation, 209, in an embodiment, the outputs of the one or more instances of the time recurrent neural network, 204, 206, may be stacked, 208, and the outputs of the one or more instances of the channel recurrent neural network, 203, 205, may be transposed and stacked, 207. In this, the final output of the linear layer, 210, is of the same dimension as the latent feature space representation prior to the application of time and channel recurrence.

Audio, in a latent feature space representation (for example, spectrogram representation), has dynamics across both time and channel dimension. Recurrent Neural Networks (RNNs) applied across two dimensions in a latent feature space representation to obtain a modified latent feature space representation help in explicitly modeling the dynamics across the two dimensions. As a result, the model (generator) is more "parameter efficient" (i.e. it is able to model the signal with lesser number of parameters).

In the absence of RNNs, that is if only convolutional layers are present (unmodified latent feature space representation), the convolutional filters are running across the time dimension only. Therefore, to achieve some modeling capability along the channel dimension, the model would need to be made deeper and/or the number of filters would need to be increased. This method may work for a very specific class of signals such as speech and applause, but for diverse signals like music, the method is ineffective, i.e. the model does not work well.

While the recurrent neural networks are not limited, in an embodiment, the recurrent neural networks may be long short-term memories or gated recurrent units.

For example, if long short-term memories (LSTM) are used, the implementation may be as follows:

```
(lstm): TCLSTM(
    (t_lstm): LSTM(hidden_size=256, input_size=256, num_layers=2,
    bidirectional=False)
    (c_lstm): LSTM(hidden_size=256, input_size=256, num_layers=2,
    bidirectional=False)
    (tc_linear): Linear(in_features=512, out_features=256, bias=True)
)
```

For T-LSTM (time LSTM):
  input_size—The number of expected features in the input=number of channels
  input of shape (seq_len, batch, input_size): tensor containing the features of the input sequence.
  seq_len=256
    output of shape (seq_len, batch, hidden_size): tensor containing the output features ($h_t$) from the last layer of the LSTM, for each t.
    During "inference" batch=1; during "training" batch ≥1, for example, 64.
For C-LSTM (channel LSTM):
  input_size—The number of expected features in the input=number of time-samples
  input of shape (seq_len, batch, input_size): tensor containing the features of the input sequence.
  seq_len=256
    output of shape (seq_len, batch, hidden_size): tensor containing the output features ($h_c$) from the last layer of the LSTM, for each c.
    During "inference" batch=1; during "training" batch ≥1, for example, 64.
  Next, the output of C-LSTM is transposed, so that the dimensions become same as the outputs of T-LSTM.
  Then, the two outputs are concatenated along the channel-dimension (channels are doubled)
  Finally, the concatenated data is input to a linear layer which reduces the number of channels (so that output dimension becomes same as the dimension of the latent feature space representation).

In case of an LSTM, the term $L_{RNN}$ layer as used above may then be used interchangeably with the term module as known in the context of LSTMs. Further, the term instance may then include all LSTM modules processing the same series of elements of the plurality of elements comprised in the latent feature space representation, for example, all channel LSTM modules processing the series of elements $c_1$.

Architecture of the Discriminator

The architecture of the discriminator may have the same structure as the encoder stage of the generator up to the recurrent unit. In other words, the discriminator architecture may mirror the structure of the encoder stage of the generator up to the recurrent unit. That is, the discriminator may include multiple layers with one or more filters in each layer. That is, the discriminator may include a number of L layers, with a number of N filters in each layer L. L may be a natural number ≥1 and N may be a natural number ≥1. While the size (also known as kernel size) of the N filters is not limited, the filter size may, however, be the same in each of the L layers, for example, the filter size may be 31. In each layer the number of filters may increase. Each of the filters may operate on the audio signal input into each of the layers of the discriminator with a stride of 2, for example. In other words, the discriminator may include multiple 1D-convolutional layers (without bias terms) with a stride of 2. A non-linear operation performed in at least one of the layers of the discriminator may include LReLU. Prepending, the discriminator may include an input layer. The input layer may be a non-strided convolutional layer (stride=1 implying non-strided).

The discriminator may further include an output layer. The output layer may have N=1 filters (the discriminator makes a single real/fake judgement) having a filter size of 1. In this, the filter size of the output layer may be different from the filter size of the discriminator layers. The output layer may thus be a one-dimensional (1D) convolution layer that does not down-sample hidden activations. This means that the filter in the output layer may operate with a stride of 1 while all previous layers of the discriminator may use a stride of 2. The activation in the output layer may be different from the activation in the at least one of the discriminator layers. The activation may be sigmoid. However, if a least squares training approach is used, sigmoid activation may not be required and is therefore optional.

Further Method for Training a Generator in a Generative Adversarial Network (GAN) Setting In an embodiment, the generator may be a generator trained in a Generative Adversarial Network setting (GAN setting). A GAN setting generally includes the generator G and a discriminator D which are trained by an iterative process. During training in the Generative Adversarial Network setting, the generator G generates a processed audio training signal x* by applying time and channel recurrence to the latent feature space representation of an audio training signal to obtain a modified latent feature space representation based on which the processed audio training signal is generated. In addition, also sinusoidal activation may be applied by at least one decoder layer of the generator to generate the processed audio training signal x*. This is especially advantageous if the audio training signal comprises tonal content. The audio training signal may be derived from an original audio signal x that has been coded and decoded, respectively. In an embodiment, a random noise vector may be applied to the modified latent feature space representation. The random noise vector may, however, be set to z=0. For coding artifact reduction setting the random noise vector to z=0 may yield the best results. Alternatively, training may be performed without the input of a random noise vector z.

The generator G tries to output a processed audio training signal x* that is indistinguishable from the original audio signal x. The discriminator D is one at a time fed with the generated processed audio training signal x* and the original audio signal x and judges in a fake/real manner whether the input signal is the processed audio training signal x* or the original audio signal x. In this, the discriminator D tries to discriminate the original audio signal x from the processed audio training signal x*. During the iterative process, the generator G then tunes its parameters to generate a better and better processed audio training signal x* as compared to the original audio signal x and the discriminator D learns to better judge between the processed audio training signal x* and the original audio signal x. This adversarial learning process may be described by the following equation (1):

$$\min_G \max_D V(D, G) = \mathbb{E}_{x \sim p_{data}(x)}[\log D(x)] + \mathbb{E}_{z \sim p_z(z)}[\log(1 - D(G(z)))] \quad (1)$$

It shall be noted that the discriminator D may be trained first in order to train the generator G in a final step. Training and updating the discriminator D may involve maximizing the probability of assigning high scores to the original audio signal x, and low scores to the processed audio training signal x*. The goal in training of the discriminator D may be that the original audio signal (uncoded) is recognized as real while the processed audio training signal x* (generated) is recognized as fake. While the discriminator D is trained and updated, the parameters of the generator G may be kept fixed.

Training and updating the generator G may then involve minimizing the difference between the original audio signal x and the generated processed audio training signal x*. The goal in training the generator G may be to achieve that the discriminator D recognizes the generated processed audio training signal x* as real.

In an embodiment, training of the generator may be performed in the perceptually weighted domain. The generator may be trained in the perceptually weighted domain in a Generative Adversarial Network setting as described above. In this case, an audio training signal in the perceptually weighted domain may be input into the generator for processing. The perceptually weighted audio training signal may be derived from the original audio signal by additionally converting the original audio signal to the perceptually weighted domain prior to coding and decoding. The conversion of the original audio signal to the perceptually weighted domain may be performed by applying a mask or a masking curve indicating masking thresholds estimated based on a psychoacoustic model. In each case, when the training of the generator is performed in the perceptually weighted domain, the generator generates a processed audio training signal in the perceptually weighted domain and the discriminator discriminates between the original audio signal in the perceptually weighted domain and the processed audio training signal in the perceptually weighted domain.

Figure 14:
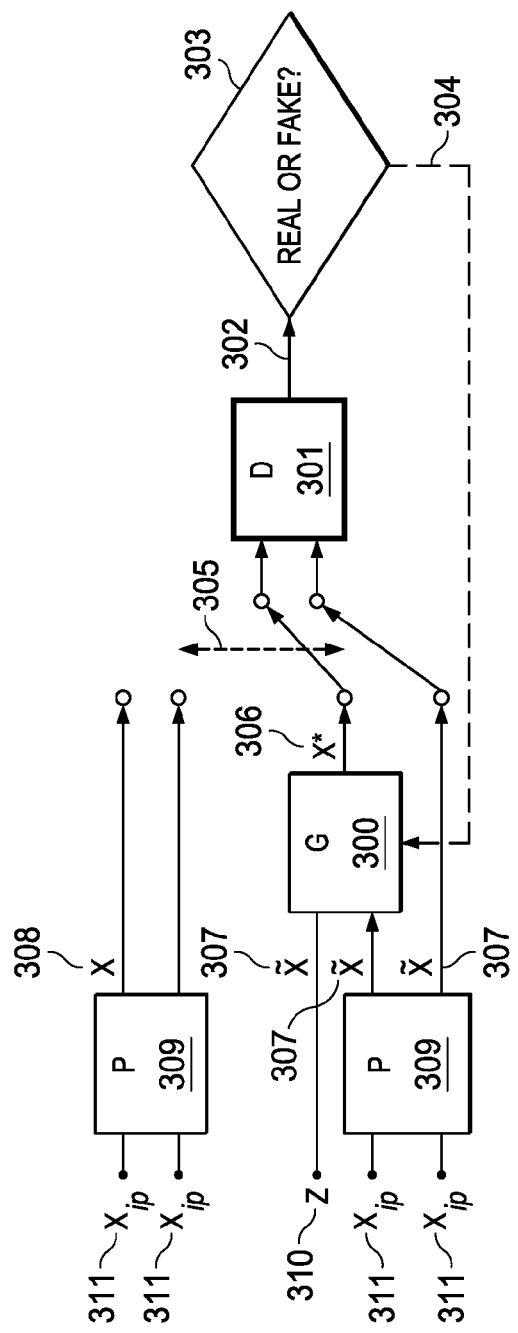
FIG. 14 illustrates another example of a method for training a generator in a Generative Adversarial Network (GAN) setting comprising the generator and a discriminator.
Figure 15:
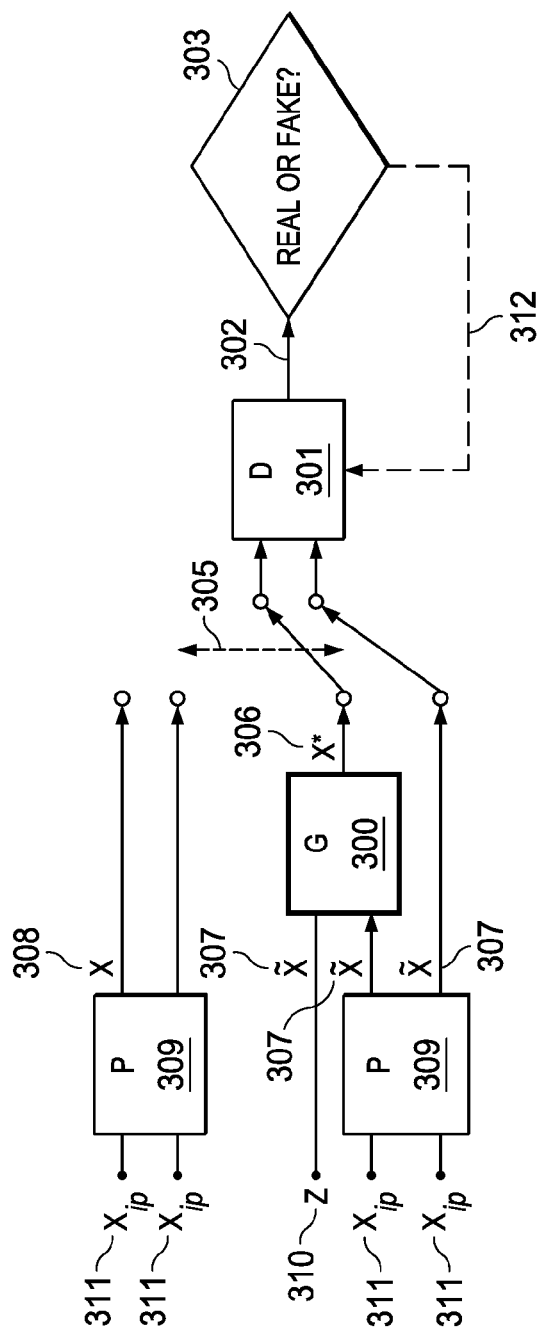
FIG. 15 illustrates another example of a method for training a discriminator in a Generative Adversarial Network (GAN) setting comprising a generator and the discriminator.

Referring to the examples of FIGS. 14 and 15, a method for training a generator and a method for training a discriminator in a Generative Adversarial Network (GAN) setting in the perceptually weighted domain is illustrated. Referring now to the example of FIG. 14, training of the generator G, 300, may involve the following. A perceptually weighted audio training signal $\tilde{x}$, 307 and optionally a random noise vector z, 310 may be input into the generator G, 300. In an embodiment, the random noise vector z, may be set to z=0. Alternatively, training may be performed without the input of a random noise vector z.

The perceptually weighted audio training signal $\tilde{x}$, 307 may be obtained by coding and decoding a perceptually weighted original audio signal, x, 308, the perceptually weighted original audio signal, x, 308, being derived by applying a mask or masking curve, P, 309, to an original audio signal, $x_{ip}$, 311, the mask or masking curve indicating masking thresholds derived from a psychoacoustic model.

Based on the input, the generator G, 300, then generates a processed perceptually weighted audio training signal x*, 306, by applying time and channel recurrence to a latent feature space representation of the perceptually weighted audio training signal to obtain a modified latent feature space representation based on which the processed perceptually weighted audio training signal is then generated. In addition, at least one decoder layer of the generator, G, 300, may apply sinusoidal activation.

One at a time, the perceptually weighted original audio signal x, 308, from which the perceptually weighted audio training signal $\tilde{x}$, 307, has been derived, and the generated processed perceptually weighted audio training signal x*, 306, are input, 305, into the discriminator D, 301. As additional information, also the perceptually weighted audio training signal Z, 307 may be input each time into the discriminator D, 301. The discriminator D, 301, then judges whether the input data is the processed perceptually weighted audio training signal x*, 306, (fake) or the perceptually weighted original audio signal x, 308 (real). In a next step, the parameters of the generator G, 300, are then tuned until the discriminator D, 301, can no longer distinguish the perceptually weighted processed audio training signal x*, 306, from the perceptually weighted original audio signal x, 308. This may be done in an iterative process, 304.

In an embodiment, judging by the discriminator D, 301, may be based on one or more of a perceptually motivated objective function as according to the following equation (2):

$$\mathcal{L}_G = \frac{1}{2}\mathbb{E}_{z \sim p_z(z), \tilde{x} \sim p_{data}(\tilde{x})}\left[(D(x^*, \tilde{x}) - 1)^2\right] + \quad (2)$$

$$\lambda \|x^* - x\|_1 + \mu \frac{1}{M}\sum_{m=1}^{M} L_{sc}^m(x, x^*) + \vartheta \frac{1}{M}\sum_{m=1}^{M} L_{mag}^m(x, x^*)$$

As can be seen from the first term in equation (2), a conditioned Generative Adversarial Network setting has been applied by inputting the perceptually weighted audio training signal $\tilde{x}$ as additional information into the discriminator.

The last two terms in the above equation (2) may be referred to as a multi-resolution STFT loss term. The multi-resolution STFT loss may be said to be the sum of different STFT-based loss functions using different STFT parameters. $L_{sc}^m$ (spectral convergence loss) and $L_{mag}^m$ (log-scale STFT magnitude loss) may apply the STFT-based loss at M different resolutions with number of FFT bins$\in$ {512, 1024, 2048}, hop sizes$\in$ {50, 120, 240}, and lastly window lengths$\in$ {240, 600, 1200}, respectively. Results showed that for handling general audio (i.e. any content type), the multi-resolution STFT loss term provides quality improvement.

The second term in equation (2) is a 1-norm distance scaled by the factor lambda $\lambda$. The value of lambda may be chosen of from 10 to 100 depending on the application and/or signal length that is input into the generator. For example, lambda may be chosen to be $\lambda$=100. Furthermore, the scaling ($\lambda$ and $\vartheta$) for the multi-resolution STFT loss term may be set to the same value as lambda.

Referring now to the example of FIG. 15, the training of the discriminator D, 301, may follow the same general process as described above for the training of the generator G, 300, except that in this case the parameters of the generator G, 300, may be fixed (indicated by the bold lines) while the parameters of the discriminator D, 301, may be varied. The training of the discriminator D, 301, may be described by the following equation (3) that enables the discriminator D, 301, to determine the processed perceptually weighted audio training signal x*, 306, as fake:

$$\min_D V_{LS-GAN}(D) = \quad (3)$$

$$\frac{1}{2}\mathbb{E}_{x, \tilde{x} \sim p_{data}(x,\tilde{x})}\left[(D(x, \tilde{x}) - 1)^2\right] + \frac{1}{2}\mathbb{E}_{z \sim p_z(z), \tilde{x} \sim p_{data}(\tilde{x})}\left[D(x^*, \tilde{x})^2\right]$$

In the above case, also the least squares approach (LS) and a conditioned Generative Adversarial Network setting has been applied by inputting the perceptually weighted audio training signal $\tilde{x}$ as additional information into the discriminator.

Besides the least squares approach, also other training methods may be used for training the generator and the discriminator in a Generative Adversarial Network setting. The present disclosure is not limited to a particular training method. Alternatively, or additionally, the so-called Wasserstein approach may be used. In this case, instead of the least squares distance the Earth Mover Distance also known as Wasserstein Distance may be used. In general, different training methods make the training of the generator and the discriminator more stable. The kind of training method applied, does, however, not impact the architecture of the generator which is detailed below.

Interpretation

Unless specifically stated otherwise, as apparent from the following discussions, it is appreciated that throughout the disclosure discussions utilizing terms such as "processing", "computing", "determining", "analyzing" or the like, refer to the action and/or processes of a computer or computing system, or similar electronic computing devices, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer" or a "computing machine" or a "computing platform" may include one or more processors.

The methodologies described herein are, in one example embodiment, performable by one or more processors that accept computer-readable (also called machine-readable) code containing a set of instructions that when executed by one or more of the processors carry out at least one of the methods described herein. Any processor capable of executing a set of instructions (sequential or otherwise) that specify actions to be taken are included. Thus, one example is a typical processing system that includes one or more processors. Each processor may include one or more of a CPU, a graphics processing unit, and a programmable DSP unit. The processing system further may include a memory subsystem including main RAM and/or a static RAM, and/or ROM. A bus subsystem may be included for communicating between the components. The processing system further may be a distributed processing system with processors coupled by a network. If the processing system requires a display, such a display may be included, e.g., a liquid crystal display (LCD) or a cathode ray tube (CRT) display. If manual data entry is required, the processing system also includes an input device such as one or more of an alphanumeric input unit such as a keyboard, a pointing control device such as a mouse, and so forth. The processing system may also encompass a storage system such as a disk drive unit. The processing system in some configurations may include a sound output device, and a network interface device. The memory subsystem thus includes a computer-readable carrier medium that carries computer-readable code (e.g., software) including a set of instructions to cause performing, when executed by one or more processors, one or more of the methods described herein. Note that when the method includes several elements, e.g., several steps, no ordering of such elements is implied, unless specifically stated. The software may reside in the hard disk, or may also reside, completely or at least partially, within the RAM and/or within the processor during execution thereof by the computer system. Thus, the memory and the processor also constitute computer-readable carrier medium carrying computer-readable code. Furthermore, a computer-readable carrier medium may form, or be included in a computer program product.

In alternative example embodiments, the one or more processors operate as a standalone device or may be connected, e.g., networked to other processor(s), in a networked deployment, the one or more processors may operate in the capacity of a server or a user machine in server-user network environment, or as a peer machine in a peer-to-peer or distributed network environment. The one or more processors may form a personal computer (PC), a tablet PC, a Personal Digital Assistant (PDA), a cellular telephone, a web appliance, a network router, switch or bridge, or any machine capable of executing a set of instructions (sequential or otherwise) that specify actions to be taken by that machine.

Note that the term "machine" shall also be taken to include any collection of machines that individually or jointly execute a set (or multiple sets) of instructions to perform any one or more of the methodologies discussed herein.

Thus, one example embodiment of each of the methods described herein is in the form of a computer-readable carrier medium carrying a set of instructions, e.g., a computer program that is for execution on one or more processors, e.g., one or more processors that are part of web server arrangement. Thus, as will be appreciated by those skilled in the art, example embodiments of the present disclosure may be embodied as a method, an apparatus such as a special purpose apparatus, an apparatus such as a data processing system, or a computer-readable carrier medium, e.g., a computer program product. The computer-readable carrier medium carries computer readable code including a set of instructions that when executed on one or more processors cause the processor or processors to implement a method. Accordingly, aspects of the present disclosure may take the form of a method, an entirely hardware example embodiment, an entirely software example embodiment or an example embodiment combining software and hardware aspects. Furthermore, the present disclosure may take the form of carrier medium (e.g., a computer program product on a computer-readable storage medium) carrying computer-readable program code embodied in the medium.

The software may further be transmitted or received over a network via a network interface device. While the carrier medium is in an example embodiment a single medium, the term "carrier medium" should be taken to include a single medium or multiple media (e.g., a centralized or distributed database, and/or associated caches and servers) that store the one or more sets of instructions. The term "carrier medium" shall also be taken to include any medium that is capable of storing, encoding or carrying a set of instructions for execution by one or more of the processors and that cause the one or more processors to perform any one or more of the methodologies of the present disclosure. A carrier medium may take many forms, including but not limited to, non-volatile media, volatile media, and transmission media. Non-volatile media includes, for example, optical, magnetic disks, and magneto-optical disks. Volatile media includes dynamic memory, such as main memory. Transmission media includes coaxial cables, copper wire and fiber optics, including the wires that comprise a bus subsystem. Transmission media may also take the form of acoustic or light waves, such as those generated during radio wave and infrared data communications. For example, the term "carrier medium" shall accordingly be taken to include, but not be limited to, solid-state memories, a computer product embodied in optical and magnetic media; a medium bearing a propagated signal detectable by at least one processor or one or more processors and representing a set of instructions that, when executed, implement a method; and a transmission medium in a network bearing a propagated signal detectable by at least one processor of the one or more processors and representing the set of instructions.

It will be understood that the steps of methods discussed are performed in one example embodiment by an appropriate processor (or processors) of a processing (e.g., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Reference throughout this disclosure to "one embodiment", "some embodiments" or "an example embodiment" means that a particular feature, structure or characteristic described in connection with the embodiment is included in at least one embodiment of the present disclosure. Thus, appearances of the phrases "in one embodiment", "in some embodiments" or "in an example embodiment" in various places throughout this disclosure are not necessarily all referring to the same example embodiment. Furthermore, the particular features, structures or characteristics may be combined in any suitable manner, as would be apparent to one of ordinary skill in the art from this disclosure, in one or more example embodiments.

As used herein, unless otherwise specified the use of the ordinal adjectives "first", "second", "third", etc., to describe a common object, merely indicate that different instances of like objects are being referred to and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

It should be appreciated that in the above description of example embodiments of the disclosure, various features of the disclosure are sometimes grouped together in a single example embodiment, Fig., or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed example embodiment. Thus, the claims following the Description are hereby expressly incorporated into this Description, with each claim standing on its own as a separate example embodiment of this disclosure.

Furthermore, while some example embodiments described herein include some but not other features included in other example embodiments, combinations of features of different example embodiments are meant to be within the scope of the disclosure, and form different example embodiments, as would be understood by those skilled in the art. For example, in the following claims, any of the claimed example embodiments can be used in any combination.

In the description provided herein, numerous specific details are set forth. However, it is understood that example embodiments of the disclosure may be practiced without these specific details. In other instances, well-known methods, structures and techniques have not been shown in detail in order not to obscure an understanding of this description.

Thus, while there has been described what are believed to be the best modes of the disclosure, those skilled in the art will recognize that other and further modifications may be made thereto without departing from the spirit of the disclosure, and it is intended to claim all such changes and modifications as fall within the scope of the disclosure. For example, any formulas given above are merely representative of procedures that may be used. Functionality may be added or deleted from the block diagrams and operations may be interchanged among functional blocks. Steps may be added or deleted to methods described within the scope of the present disclosure.

In the following, further details of the present disclosure will be described in a non-limiting manner by two sets of enumerated example embodiments, EEEa and EEEa:

EEEa 1 A method of processing an audio signal using a deep-learning-based generator, the generator comprising an encoder stage and a decoder stage, each including multiple layers with one or more filters in each layer, the last layer of the encoder stage mapping to a latent feature space representation comprising a plurality of elements along a channel dimension and a time dimension, wherein the method includes the steps of:
(a) inputting the audio signal into the generator for processing the audio signal;
(b) mapping a time segment of the audio signal to the latent feature space representation, using the encoder stage of the generator;
(c) applying time and channel recurrence to the latent feature space representation to obtain a modified latent feature space representation; and
(e) obtaining, as an output from the decoder stage of the generator, a processed audio signal based on the modified latent feature space representation.

EEEa 2 The method according to EEEa 1, wherein the method further includes the step of receiving an audio bitstream including the audio signal.

EEEa 3 The method according to EEEa 2, wherein the method further includes core decoding the audio bitstream to obtain the audio signal.

EEEa 4 The method according to any one of EEEa 1 to EEEa 3, wherein the method is performed in a perceptually weighted domain, and wherein in step (e) a processed audio signal in the perceptually weighted domain is obtained as an output from the decoder stage of the generator.

EEEa 5. The method according to EEEa 4, wherein the method further includes the step of converting the processed audio signal from the perceptually weighted domain to an original signal domain.

EEEa 6 The method according to EEEa 5, wherein converting the processed audio signal from the perceptually weighted domain to the original signal domain is based on applying an inverse mask to the processed audio signal in the perceptually weighted domain, the inverse mask being calculated based on a psychoacoustic model.

EEEa 7 The method according to EEEa 6, wherein the audio bitstream further includes metadata indicative of the mask to be applied for converting the processed audio signal from the perceptually weighted domain to the original signal domain.

EEEa 8 The method according to any one of EEEa 1 to EEEa 7, wherein the generator is a generator trained in the perceptually weighted domain.

EEEa 9 The method according to any one of EEEa 1 to EEEa 8, wherein the generator is a generator trained in a Generative Adversarial Network setting.

EEEa 10 The method according to any one of EEEa 1 to EEEa 9, wherein in at least one layer of the encoder stage and at least one layer of the decoder stage a non-linear operation is performed including one or more of ReLU, PReLU, LReLU, eLU and SeLU.

EEEa 11 The method according to any one of EEEa 1 to EEEa 10, wherein the generator further includes a non-strided transposed convolutional layer as an output layer following a last layer of the decoder stage.

EEEa 12 The method according to any one of EEEa 1 to EEEa 11, wherein one or more skip connections exist between respective homologous layers of the encoder stage and the decoder stage of the generator.

EEEa 13 The method according to any one of EEEa 1 to EEEa 12, wherein the generator further includes a recurrent unit subsequent to the last layer of the encoder stage for applying the time and channel recurrence to the latent feature space representation.

EEEa 14 The method according to EEEa 13, wherein the recurrent unit includes one or more instances of a time recurrent neural network and one or more instances of a channel recurrent neural network.

EEEa 15 The method according to EEEa 14, wherein each of the one or more instances of the time recurrent neural network processes a series of elements of the plurality of elements comprised in the latent feature space representation along the time dimension, and wherein each of the one or more instances of the channel recurrent neural network processes a series of elements of the plurality of elements comprised in the latent feature space representation along the channel dimension.

EEEa 16 The method according to EEEa 14 or EEEa 15, wherein the time recurrent neural network and the channel recurrent neural network each include two or more $L_{RNN}$ layers and M hidden activations, wherein M is a natural number $\geq 1$.

EEEa 17 The method according to any one of EEEa 14 to EEEa 16, wherein outputs of the one or more instances of the time recurrent neural network and outputs of the one or more instances of the channel recurrent neural network are concatenated along the channel dimension, followed by mapping to the modified latent feature space representation using a linear layer.

EEEa 18 The method according to EEEa 17, wherein, prior to concatenation, the outputs of the one or more instances of the time recurrent neural network are stacked and the outputs of the one or more instances of the channel recurrent neural network are transposed and stacked.

EEEa 19 The method according to any one of EEEa 14 to EEEa 18, wherein the recurrent neural networks are long short-term memories or gated recurrent units.

EEEa 20 The method according to any one of EEEa 1 to EEEa 19, wherein a random noise vector z is applied to the modified latent feature space representation for modifying audio.

EEEa 21 The method according to any one of EEEa 1 to EEEa 20, wherein the method further includes the following steps to be performed before step (a):
(i) inputting an audio training signal into the generator;
(ii) generating, by the generator, a processed audio training signal based on the audio training signal by applying time and channel recurrence to the latent feature space representation of the audio training signal to obtain a modified latent feature space representation based on which the processed audio training signal is generated;
(iii) inputting, one at a time, the processed audio training signal and a corresponding original audio signal, from which the audio training signal has been derived, into a discriminator;
(iv) judging by the discriminator whether the input audio signal is the processed audio training signal or the original audio signal; and
(v) iteratively tuning the parameters of the generator until the discriminator can no longer distinguish the processed audio training signal from the original audio signal.

EEEa 22 The method according to EEEa 21, wherein steps (i) to (v) are performed in the perceptually weighted domain.

EEEa 23 A method for training a generator in a Generative Adversarial Network (GAN) setting comprising a generator and a discriminator, the generator comprising an encoder stage and a decoder stage, each including multiple layers with one or more filters in each layer, the last layer of the encoder stage mapping to a latent feature space representation comprising a plurality of elements along a channel dimension and a time dimension, wherein the method includes the steps of:
(a) inputting an audio training signal into the generator;
(b) generating, by the generator, a processed audio training signal based on the audio training signal by applying time and channel recurrence to the latent feature space representation of the audio training signal to obtain a modified latent feature space representation based on which the processed audio training signal is generated;
(c) inputting, one at a time, the processed audio training signal and a corresponding original audio signal, from which the audio training signal has been derived, into the discriminator;
(d) judging by the discriminator whether the input audio signal is the processed audio training signal or the original audio signal; and
(e) iteratively tuning the parameters of the generator until the discriminator can no longer distinguish the processed audio training signal from the original audio signal.

EEEa 24 The method according to EEEa 23, wherein steps (a) to (e) are performed in the perceptually weighted domain.

EEEa 25 The method according to EEEa 23 or EEEa 24, wherein in at least one layer of the encoder stage and at least one layer of the decoder stage a non-linear operation is performed including one or more of ReLU, PReLU, LReLU, eLU and SeLU.

EEEa 26 The method according to any one of EEEa 23 to EEEa 25, wherein the generator further includes a non-strided transposed convolutional layer as an output layer following a last layer of the decoder stage.

EEEa 27 The method according to any one of EEEa 23 to EEEa 26, wherein one or more skip connections exist between respective homologous layers of the encoder stage and the decoder stage of the generator.

EEEa 28 The method according to any one of EEEa 23 to EEEa 27, wherein the generator further includes a recurrent unit subsequent to the last layer of the encoder stage for applying the time and channel recurrence to the latent feature space representation.

EEEa 29 The method according to EEEa 28, wherein the recurrent unit includes one or more instances of a time recurrent neural network and one or more instances of a channel recurrent neural network.

EEEa 30 The method according to EEEa 29, wherein each of the one or more instances of the time recurrent neural network processes a series of elements of the plurality of elements comprised in the latent feature space representation along the time dimension, and wherein each of the one or more instances of the channel recurrent neural network processes a series of elements of the plurality of elements comprised in the latent feature space representation along the channel dimension.

EEEa 31 The method according to EEEa 29 or EEEa 30, wherein the time recurrent neural network and the channel recurrent neural network each include two or more $L_{RNN}$ layers and M hidden activations, wherein M is a natural number $\geq 1$.

EEEa 32 The method according to any one of EEEa 29 to EEEa 31, wherein outputs of the one or more instances of the time recurrent neural network and outputs of the one or more instances of the channel recurrent neural network are concatenated along the channel dimension, followed by mapping to the modified latent feature space representation using a linear layer.

EEEa 33 The method according to EEEa 32, wherein, prior to concatenation, the outputs of the one or more instances of the time recurrent neural network are stacked and the outputs of the one or more instances of the channel recurrent neural network are transposed and stacked.

EEEa 34 The method according to any one of EEEa 29 to EEEa 33, wherein the recurrent neural networks are long short-term memories or gated recurrent units.

EEEa 35. The method according to any one of EEEa 23 to EEEa 34, wherein a random noise vector z is applied to the modified latent feature space representation for modifying audio.

EEEa 36 An apparatus for generating a processed audio signal, wherein the apparatus includes a deep-learning-based generator, the generator comprising an encoder stage and a decoder stage, each including multiple layers with one or more filters in each layer, the last layer of the encoder stage mapping to a latent feature space representation comprising a plurality of elements along a channel dimension and a time dimension, and wherein the generator is configured to:
(a) process an input audio signal;
(b) map a time segment of the audio signal to the latent feature space representation, using the encoder stage;
(c) apply time and channel recurrence to the latent feature space representation to obtain a modified latent feature space representation; and
(d) output, from the decoder stage, a processed audio signal based on the modified latent feature space representation.

EEEa 37 The apparatus according to EEEa 36, further including a receiver for receiving an audio bitstream including the audio signal.

EEEa 38 The apparatus according to EEEa 36 or EEEa 37, further including a core decoder for core decoding the audio bitstream to obtain the audio signal.

EEEa 39 The apparatus according to any one of EEEa 36 to EEEa 38, wherein the apparatus is configured to generate the processed audio signal in a perceptually weighted domain.

EEEa 40 The apparatus according to EEEa 39, further including a demultiplexer for demultiplexing the audio bitstream, wherein the audio bitstream includes metadata indicative of a mask to be applied for converting the processed audio signal from the perceptually weighted domain to an original signal domain.

EEEa 41 A computer program product comprising a computer-readable storage medium with instructions adapted to cause the device to carry out the method according to any one of EEEa 1 to EEEa 22 when executed by a device having processing capability.

EEEa 42 A computer program product comprising a computer-readable storage medium with instructions adapted to cause the device to carry out the method according to any one of EEEa 23 to EEEa when executed by a device having processing capability.

EEEa 43 A system of an apparatus for generating a processed audio signal and a Generative Adversarial Network comprising a generator and a discriminator, wherein the system is configured to perform the method according to any one of EEEa 1 to EEEa 35.

EEEa 44 A system of an apparatus for generating an audio signal and encoding the audio signal in an audio bitstream and an apparatus for generating a processed audio signal according to any one of EEEa 36 to EEEa 40.

EEEb 1 A method of processing an audio signal using a deep-learning-based generator, the generator comprising an encoder stage and a decoder stage, each including multiple layers with a plurality of filters in each layer, the plurality of filters in each layer of the decoder stage performing a filtering operation generating a plurality of feature maps, and the last layer of the encoder stage mapping to a latent feature space representation, wherein the method includes the steps of:
  (a) inputting the audio signal into the generator for processing the audio signal;
  (b) mapping a time segment of the audio signal to the latent feature space representation, using the encoder stage of the generator;
  (c) upsampling the latent feature space representation using the decoder stage of the generator, wherein at least one layer of the decoder stage applies sinusoidal activation; and
  (d) obtaining, as an output from the decoder stage of the generator, a processed audio signal.

EEEb 2 The method according to EEEb 1, wherein the sinusoidal activation is implemented by a sinusoidal activation function, the sinusoidal activation function having at least one trainable parameter.

EEEb 3 The method according to EEEb 2, wherein the sinusoidal activation function is a parametric squared sine activation function corresponding to $f(x)=x+(1/a)\sin^2(ax+\varphi)$.

EEEb 4 The method according to EEEb 2 or EEEb 3, wherein the generator is a generator trained in a Generative Adversarial Network setting, and wherein values of the at least one trainable parameter of the sinusoidal activation function have been obtained by training the generator in the Generative Adversarial Network (GAN) setting.

EEEb 5 The method according to any one of EEEb 1 to EEEb 4, wherein in step (c) the at least one layer of the decoder stage applies the sinusoidal activation individually to each of the plurality of feature maps generated in the at least one layer of the decoder stage.

EEEb 6 The method according to EEEb 5, wherein in step (c) two or more layers of the decoder stage apply the sinusoidal activation individually to each of the plurality of feature maps generated in each of the two or more layers of the decoder stage.

EEEb 7 The method according to EEEb 5 or EEEb 6 when depending on any one of EEEb 2 to EEEb 4, wherein the values of the at least one trainable parameter of the sinusoidal activation function for the at least one layer is represented by a non-uniform distribution, each value in the non-uniform distribution corresponding to a value individually obtained for a respective one of the plurality of feature maps generated in the at least one layer.

EEEb 8 The method according to EEEb 7, wherein the shape of the non-uniform distribution is dependent on a content of the audio signal and/or a decoder layer number.

EEEb 9 The method according to any one of EEEb 1 to EEEb 8, wherein the audio signal comprises tonal content.

EEEb 10. The method according to any one of EEEb 1 to EEEb 9, wherein in at least one layer of the encoder stage a non-linear operation is performed including one or more of ReLU, PReLU, LReLU, eLU and SeLU.

EEEb 11 The method according to any one of EEEb 1 to EEEb 10, wherein the generator further includes a non-strided transposed convolutional layer as an output layer following a last layer of the decoder stage, and wherein the output layer applies a tanh activation.

EEEb 12 The method according to any one of EEEb 1 to EEEb 11, wherein one or more skip connections exist between respective homologous layers of the encoder stage and the decoder stage of the generator.

EEEb 13 The method according to any one of EEEb 1 to EEEb 12, wherein a random noise vector z is applied to the latent feature space representation for modifying audio.

EEEb 14 The method according to any one of EEEb 1 to EEEb 13, wherein the method further includes the step of receiving an audio bitstream including the audio signal.

EEEb 15 The method according to EEEb 14, wherein the method further includes core decoding the audio bitstream to obtain the audio signal.

EEEb 16 The method according to any one of EEEb 1 to EEEb 15, wherein the method further includes the following steps to be performed before step (a):
  (i) inputting an audio training signal into the generator;
  (ii) generating, by the generator, a processed audio training signal based on the audio training signal by mapping a time segment of the audio training signal to the latent feature space representation, using the encoder stage of the generator, and upsampling the latent feature space representation, using the decoder stage of the generator, wherein at least one layer of the decoder stage applies sinusoidal activation;
  (iii) inputting, one at a time, the processed audio training signal and a corresponding original audio signal, from which the audio training signal has been derived, into a discriminator;
  (iv) judging by the discriminator whether the input audio signal is the processed audio training signal or the original audio signal; and
  (v) iteratively tuning the parameters of the generator until the discriminator can no longer distinguish the processed audio training signal from the original audio signal.

EEEb 17 The method according to EEEb 16, wherein the iteratively tuning the parameters of the generator in step (v) includes iteratively tuning the values of the at least one trainable parameter of the sinusoidal activation function.

EEEb 18 The method according to EEEb 17, wherein the sinusoidal activation function is a parametric squared sine activation function corresponding to $f(x)=x+(1/a)\sin^2(ax+\varphi)$, and wherein a is the at least one trainable parameter.

EEEb 19 The method according to EEEb 16 to EEEb 18, wherein the at least one layer of the decoder stage applies sinusoidal activation individually to each of the plurality of feature maps generated in the at least one layer of the decoder stage, and wherein the iteratively tuning the parameters of the generator in step (v) includes iteratively tuning the value of the at least one trainable parameter of the sinusoidal activation function for each of the plurality of feature maps.

EEEb 20 The method according to EEEb 19, wherein two or more layers of the decoder stage apply sinusoidal activation individually to each of the plurality of feature maps generated in the two or more layers of the decoder stage, and wherein the iteratively tuning the parameters of the generator in step (v) includes iteratively tuning the value of the at least one trainable parameter of the sinusoidal activation function for each of the plurality of feature maps.

EEEb 21 The method according to any one of EEEb 16 to EEEb 20, wherein the audio training signal comprises tonal content.

EEEb 22 The method according to any one of EEEb 16 to EEEb 21, wherein step (i) further includes, prior to inputting the audio training signal, applying a random initialization scheme for initializing values of the at least one trainable parameter of the sinusoidal activation function.

EEEb 23 The method according to any one of EEEb 16 to EEEb 21, wherein step (i) further includes, prior to inputting the audio training signal, applying a one-sided exponential initialization scheme for initializing values of the at least one trainable parameter of the sinusoidal activation function, so that a distribution of the values of the trainable parameter of the sinusoidal activation function for the at least one layer substantially corresponds to a one-sided exponential distribution.

EEEb 24 A method for training a generator in a Generative Adversarial Network (GAN) setting comprising a generator and a discriminator, the generator comprising an encoder stage and a decoder stage, each including multiple layers with a plurality of filters in each layer, the plurality of filters in each layer of the decoder stage performing a filtering operation generating a plurality of feature maps, and the last layer of the encoder stage mapping to a latent feature space representation, wherein the method includes the steps of:
  (a) inputting an audio training signal into the generator;
  (b) generating, by the generator, a processed audio training signal based on the audio training signal by mapping a time segment of the audio training signal to the latent feature space representation, using the encoder stage of the generator, and upsampling the latent feature space representation, using the decoder stage of the generator, wherein at least one layer of the decoder stage applies sinusoidal activation;
  (c) inputting, one at a time, the processed audio training signal and a corresponding original audio signal, from which the audio training signal has been derived, into the discriminator;
  (d) judging by the discriminator whether the input audio signal is the processed audio training signal or the original audio signal; and
  (e) iteratively tuning the parameters of the generator until the discriminator can no longer distinguish the processed audio training signal from the original audio signal.

EEEb 25 The method according to EEEb 24, wherein the sinusoidal activation is implemented by a sinusoidal activation function, the sinusoidal activation function having at least one trainable parameter.

EEEb 26 The method according to EEEb 25, wherein the sinusoidal activation function is a parametric squared sine activation function corresponding to $f(x)=x+(1/a)\sin^2(ax+\varphi)$, and wherein a is the at least one trainable parameter.

EEEb 27 The method according to EEEb 25 or EEEb 26, wherein the iteratively tuning the parameters of the generator in step (e) includes tuning values of the at least one trainable parameter of the sinusoidal activation function.

EEEb 28 The method according to any one of EEEb 25 to EEEb 27, wherein the at least one layer of the decoder stage applies sinusoidal activation individually to each of the plurality of feature maps generated in the at least one layer of the decoder stage, and wherein the iteratively tuning the parameters of the generator in step (e) includes iteratively tuning the value of the at least one trainable parameter of the sinusoidal activation function for each of the plurality of feature maps.

EEEb 29 The method according to EEEb 28, wherein two or more layers of the decoder stage apply sinusoidal activation individually to each of the plurality of feature maps generated in the two or more layers of the decoder stage, and wherein the iteratively tuning the parameters of the generator in step (e) includes iteratively tuning the value of the at least one trainable parameter of the sinusoidal activation function for each of the plurality of feature maps.

EEEb 30 The method according to any one of EEEb 24 to EEEb 29, wherein the audio training signal comprises tonal content.

EEEb 31 The method according to any one of EEEb 25 to EEEb 30, wherein step (a) further includes, prior to inputting the audio training signal, applying a random initialization scheme for initializing values of the at least one trainable parameter of the sinusoidal activation function.

EEEb 32 The method according to any one of EEEb 25 to EEEb 30, wherein step (a) further includes, prior to inputting the audio training signal, applying a one-sided exponential initialization scheme for initializing values of the at least one trainable parameter of the sinusoidal activation function, so that a distribution of the values of the trainable parameter of the sinusoidal activation function for the at least one layer substantially corresponds to a one-sided exponential distribution.

EEEb 33 The method according to any one of EEEb 24 to EEEb 32, wherein in at least one layer of the encoder stage a non-linear operation is performed including one or more of ReLU, PReLU, LReLU, eLU and SeLU.

EEEb 34 The method according to any one of EEEb 24 to EEEb 33, wherein the generator further includes a non-strided transposed convolutional layer as an output layer following a last layer of the decoder stage, wherein the output layer applies a tanh activation.

EEEb 35 The method according to any one of EEEb 24 to EEEb 34, wherein one or more skip connections exist between respective homologous layers of the encoder stage and the decoder stage of the generator.

EEEb 36 The method according to any one of EEEb 24 to EEEb 35, wherein a random noise vector z is applied to the latent feature space representation for modifying audio.

EEEb 37 An apparatus for generating a processed audio signal, wherein the apparatus includes a deep-learning-based generator, the generator comprising an encoder stage and a decoder stage, each including multiple layers with a plurality of filters in each layer, the plurality of filters in each layer of the decoder stage performing a filtering operation generating a plurality of feature maps, and the last layer of the encoder stage mapping to a latent feature space representation, and wherein the generator is configured to:
(a) process an input audio signal;
(b) map a time segment of the audio signal to the latent feature space representation, using the encoder stage;
(c) upsample the latent feature space representation using the decoder stage, wherein at least one layer of the decoder stage applies sinusoidal activation; and
(d) output, from the decoder stage, a processed audio signal.

EEEb 38 The apparatus according to EEEb 37, further including a receiver for receiving an audio bitstream including the audio signal.

EEEb 39 The apparatus according to EEEb 38, further including a core decoder for core decoding the audio bitstream to obtain the audio signal.

EEEb 40 A computer program product comprising a computer-readable storage medium with instructions adapted to cause the device to carry out the method according to any one of EEEb 1 to EEEb 23 when executed by a device having processing capability.

EEEb 41 A computer program product comprising a computer-readable storage medium with instructions adapted to cause the device to carry out the method according to any one of EEEb 24 to EEEb 36 when executed by a device having processing capability.

EEEb 42 A system of an apparatus for generating a processed audio signal and a Generative Adversarial Network comprising a generator and a discriminator, wherein the system is configured to perform the method according to any one of EEEb 1 to EEEb 36.

EEEb 43 A system of an apparatus for generating an audio signal and encoding the audio signal in an audio bitstream and an apparatus for generating a processed audio signal according to any one of EEEb 37 to EEEb 39.

The invention claimed is:

1. A computer-implemented method of processing an audio signal for reducing coding noise using a deep-learning-based generator, the generator comprising an encoder stage and a decoder stage, each including multiple layers with one or more filters in each layer, the last layer of the encoder stage mapping to a latent feature space representation comprising a plurality of elements along a channel dimension and a time dimension, wherein the method includes the steps of:
(a) inputting the audio signal into the generator for processing the audio signal;
(b) mapping a time segment of the audio signal to the latent feature space representation, using the encoder stage of the generator;
(c) applying time and channel recurrence to the latent feature space representation to obtain a modified latent feature space representation; and
(e) obtaining, as an output from the decoder stage of the generator, a processed audio signal based on the modified latent feature space representation.

2. The method according to claim 1, wherein the method is performed in a perceptually weighted domain, and wherein in step (e) a processed audio signal in the perceptually weighted domain is obtained as an output from the decoder stage of the generator.

3. The method according to claim 2, wherein the method further includes the step of converting the processed audio signal from the perceptually weighted domain to an original signal domain.

4. The method according to claim 3, wherein converting the processed audio signal from the perceptually weighted domain to the original signal domain is based on applying an inverse mask to the processed audio signal in the perceptually weighted domain, the inverse mask being calculated based on a psychoacoustic model.

5. The method according to claim 4, wherein the audio bitstream further includes metadata indicative of the mask to be applied for converting the processed audio signal from the perceptually weighted domain to the original signal domain.

6. The method according to claim 1, wherein the generator is a generator trained in the perceptually weighted domain.

7. The method according to claim 1, wherein the generator further includes a recurrent unit subsequent to the last layer of the encoder stage for applying the time and channel recurrence to the latent feature space representation.

8. The method according to claim 7, wherein the recurrent unit includes one or more instances of a time recurrent neural network and one or more instances of a channel recurrent neural network.

9. The method according to claim 8, wherein each of the one or more instances of the time recurrent neural network processes a series of elements of the plurality of elements comprised in the latent feature space representation along the time dimension, and wherein each of the one or more instances of the channel recurrent neural network processes a series of elements of the plurality of elements comprised in the latent feature space representation along the channel dimension.

10. The method according to claim 8, wherein the time recurrent neural network and the channel recurrent neural network each include two or more $L_{RNN}$ layers and M hidden activations, wherein M is a natural number $\geq 1$.

11. The method according to claim 8, wherein outputs of the one or more instances of the time recurrent neural network and outputs of the one or more instances of the channel recurrent neural network are concatenated along the channel dimension, followed by mapping to the modified latent feature space representation using a linear layer.

12. The method according to claim 11, wherein, prior to concatenation, the outputs of the one or more instances of the time recurrent neural network are stacked and the outputs of the one or more instances of the channel recurrent neural network are transposed and stacked.

13. A method of processing an audio signal for reducing coding noise using a deep-learning-based generator, the generator comprising an encoder stage and a decoder stage, each including multiple layers with a plurality of filters in each layer, the plurality of filters in each layer of the decoder stage performing a filtering operation generating a plurality of feature maps, and the last layer of the encoder stage mapping to a latent feature space representation, wherein the method includes the steps of:
(a) inputting the audio signal into the generator for processing the audio signal;
(b) mapping a time segment of the audio signal to the latent feature space representation, using the encoder stage of the generator;
(c) upsampling the latent feature space representation using the decoder stage of the generator, wherein at least one layer of the decoder stage applies sinusoidal activation; and
(d) obtaining, as an output from the decoder stage of the generator, a processed audio signal.

14. The method according to claim 13, wherein the sinusoidal activation is implemented by a sinusoidal activation function, the sinusoidal activation function having at least one trainable parameter.

15. The method according to claim 14, wherein the sinusoidal activation function is a parametric squared sine activation function corresponding to $f(x)=x+(1/a)\sin^2(ax+\varphi)$.

16. The method according to claim 14, wherein the generator is a generator trained in a Generative Adversarial Network setting, and wherein values of the at least one trainable parameter of the sinusoidal activation function have been obtained by training the generator in the Generative Adversarial Network (GAN) setting.

17. The method according to claim 13, wherein in step (c) the at least one layer of the decoder stage applies the sinusoidal activation individually to each of the plurality of feature maps generated in the at least one layer of the decoder stage.

18. The method according to claim 17, wherein in step (c) two or more layers of the decoder stage apply the sinusoidal activation individually to each of the plurality of feature maps generated in each of the two or more layers of the decoder stage.

19. The method according to claim 17 when depending on any one of claims 14 to 16, wherein the values of the at least one trainable parameter of the sinusoidal activation function for the at least one layer is represented by a non-uniform distribution, each value in the non-uniform distribution corresponding to a value individually obtained for a respective one of the plurality of feature maps generated in the at least one layer.

20. The method according to claim 19, wherein the shape of the non-uniform distribution is dependent on a content of the audio signal and/or a decoder layer number.

* * * * *